United States Patent [19]

Smith

[11] 4,180,799

[45] Dec. 25, 1979

[54] APPARATUS AND METHOD FOR RECOGNIZING CHARACTERS

[75] Inventor: William R. Smith, Mountain View, Calif.

[73] Assignee: Caere Corporation, Los Gatos, Calif.

[21] Appl. No.: 898,822

[22] Filed: Apr. 21, 1978

[51] Int. Cl.² .............................................. G06K 9/12
[52] U.S. Cl. ................... 340/146.3 AC; 340/146.3 H; 340/146.3 MA
[58] Field of Search .............. 340/146.3 H, 146.3 AC, 340/146.3 AG, 146.3 MA, 146.3 J, 146.3 R

[56] References Cited

U.S. PATENT DOCUMENTS

| | | | |
|---|---|---|---|
| 3,231,860 | 1/1966 | Chatten | 340/146.3 H |
| 3,506,807 | 4/1970 | Malaby | 340/146.3 H |
| 3,603,930 | 9/1971 | Britt | 340/146.3 J |
| 3,761,876 | 9/1973 | Flaherty et al. | 340/146.3 H |
| 3,869,698 | 3/1975 | Trost et al. | 340/146.3 AG |
| 3,964,022 | 6/1976 | Martin | 340/146.3 H |
| 4,075,605 | 2/1978 | Hilley et al. | 340/146.3 AC |
| 4,104,616 | 8/1978 | Isshiki et al. | 340/146.3 J |

Primary Examiner—Leo H. Boudreau
Attorney, Agent, or Firm—Blakely, Sokoloff, Taylor & Zafman

[57] ABSTRACT

An optical reader for recognizing printed characters, such as alpha-numeric characters, is disclosed. The characters are scanned in parallel, vertical slices by a photodiode array contained in a hand-held wand which is manually moved over the printed characters. The resultant video signals are examined for predetermined features, such as gaps, bars, strokes, etc. These features are encoded into a digital word for each slice. A logic tree analysis is used in which each new digital word is compared to words along the tree to direct the analysis to branches or substances. The continued comparison leads to a positive recognition of a single character. The raw video is not stored as in prior art systems, but rather the video signals are processed in a serial manner with feature identification occurring without storage. The processing circuitry thus is efficiently used since the video signals are processed as they occur.

20 Claims, 16 Drawing Figures

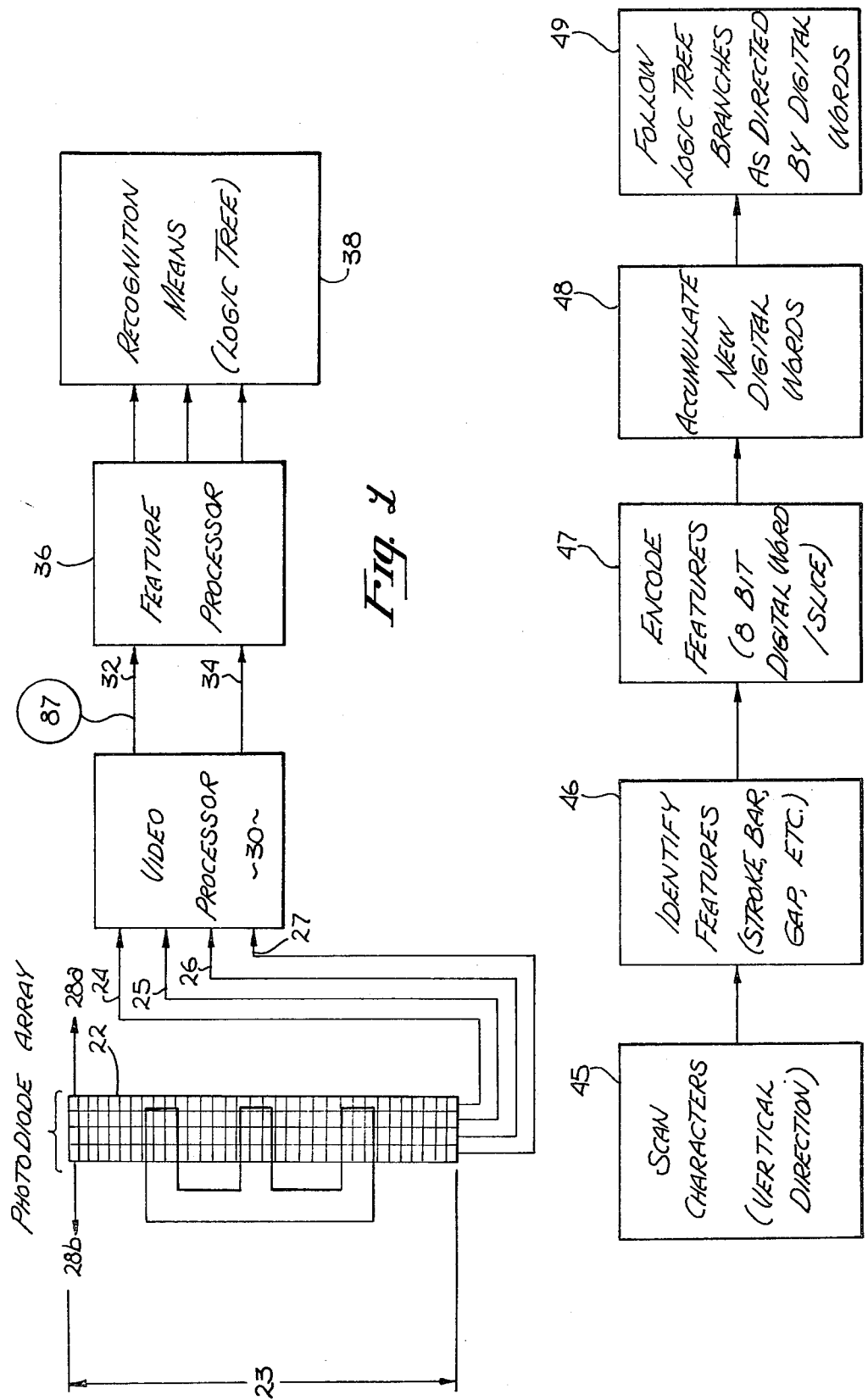

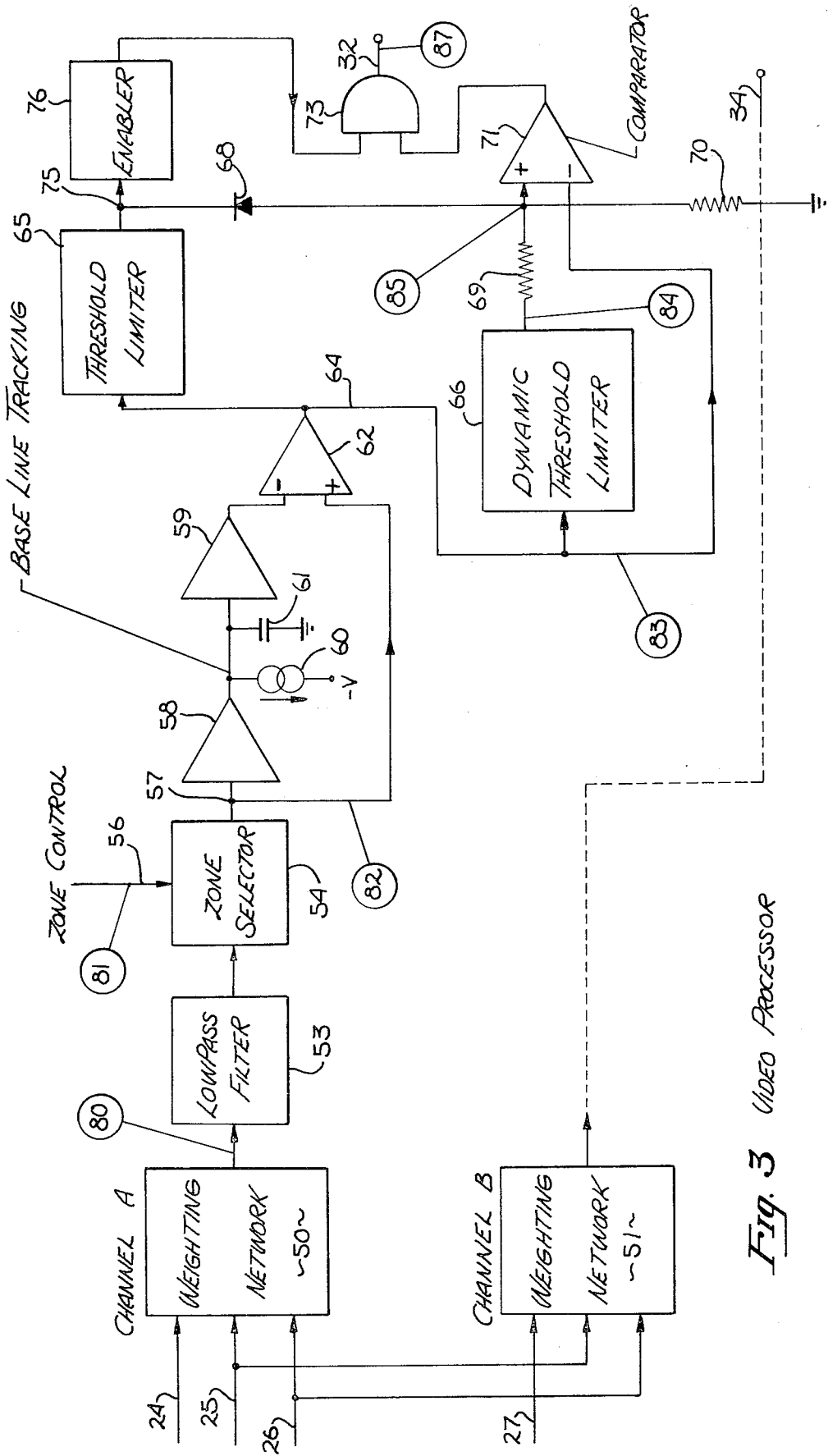
Fig. 3 VIDEO PROCESSOR

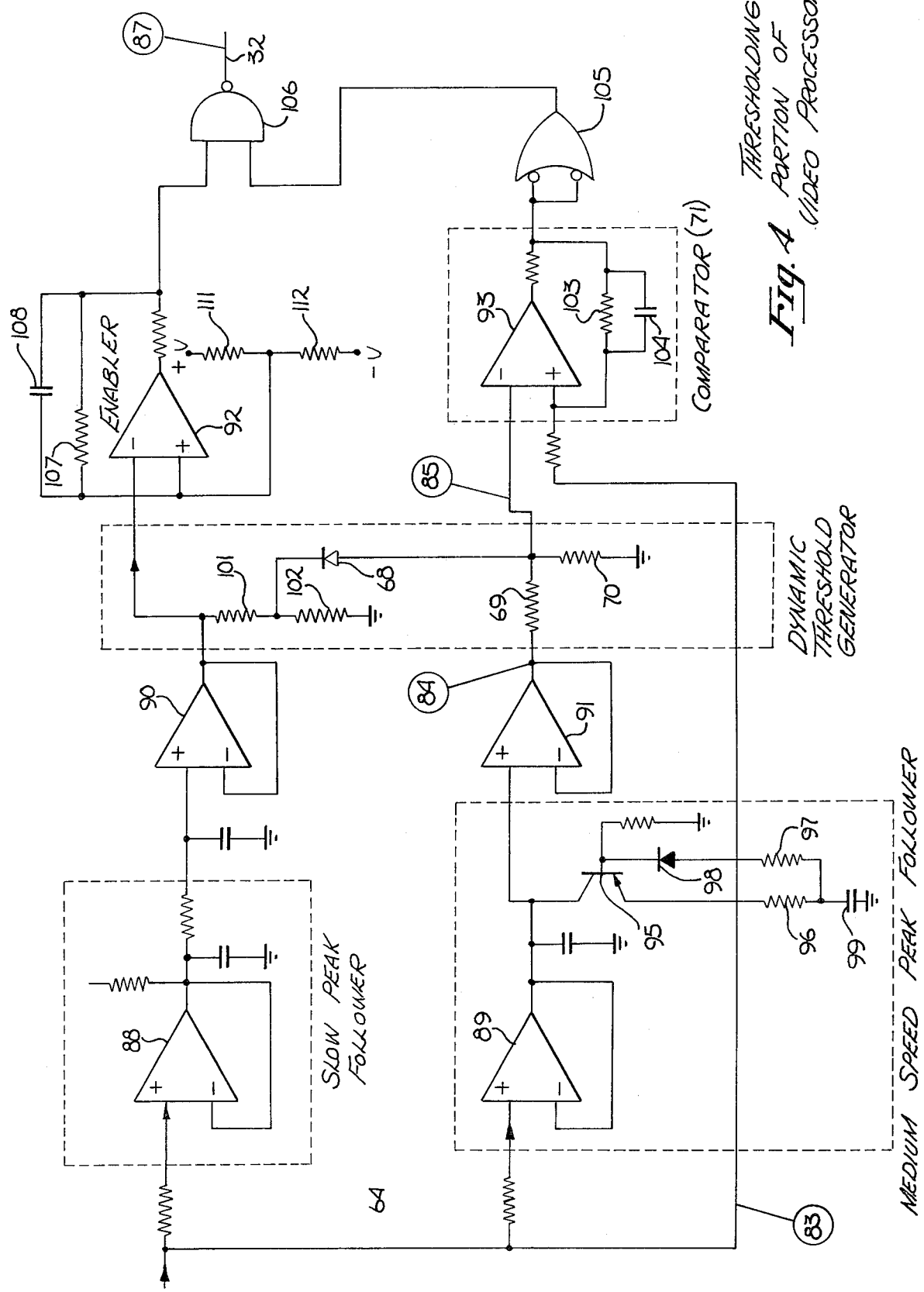
Fig. 4 THRESHOLDING PORTION OF VIDEO PROCESSOR

Fig. 7 FEATURE ANALYZER

FEATURE DETECTION — SIZING
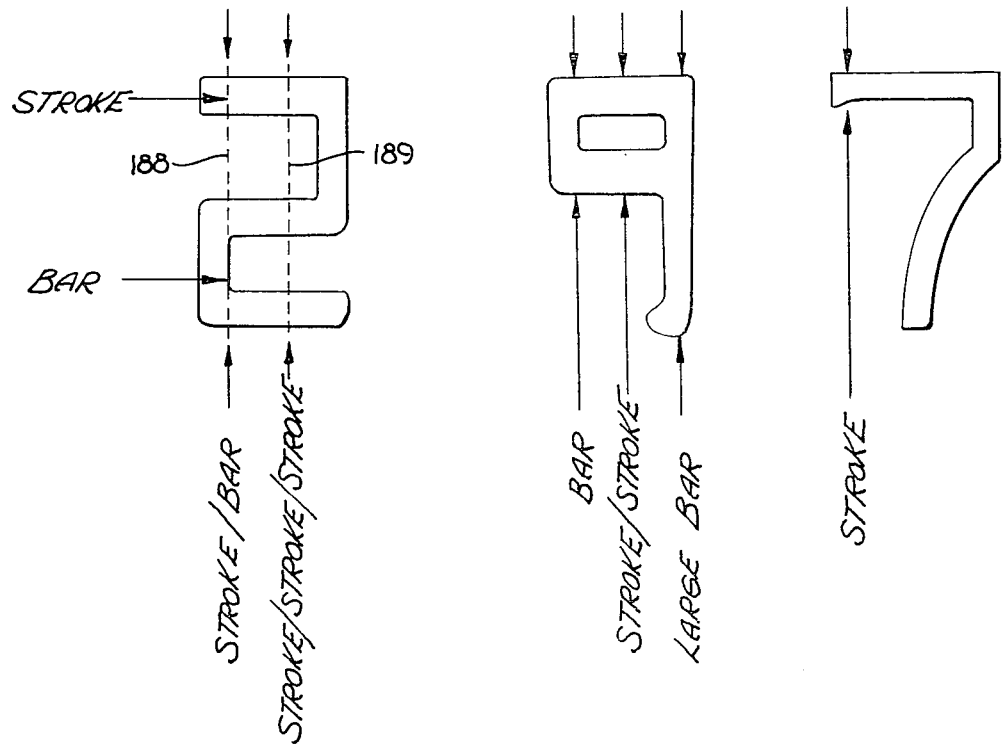
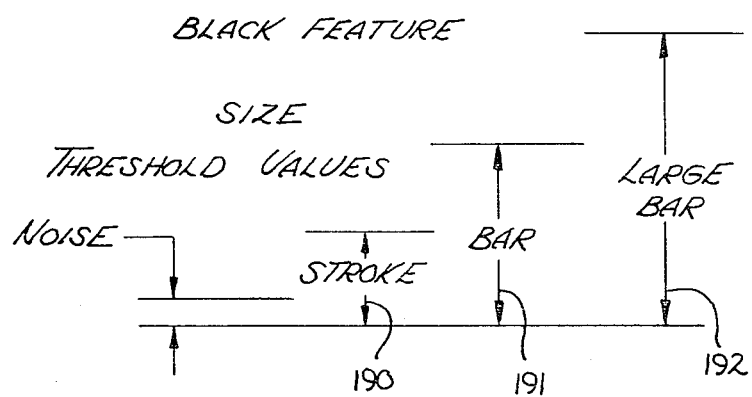
Fig. 9

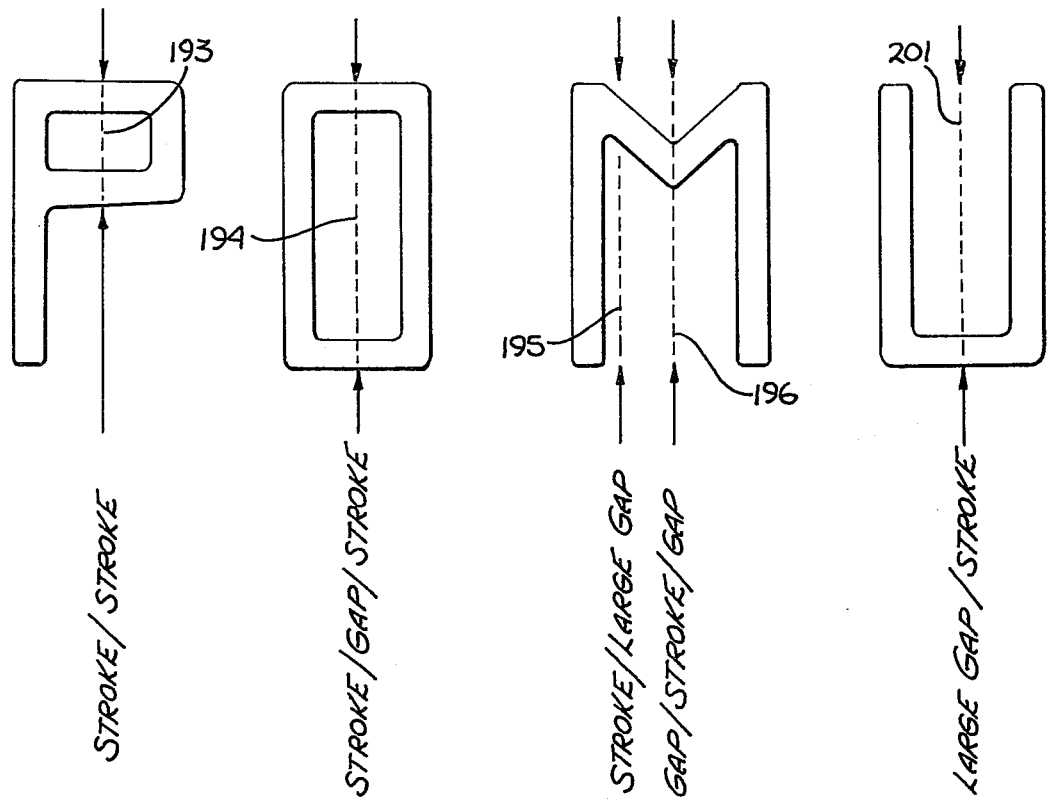
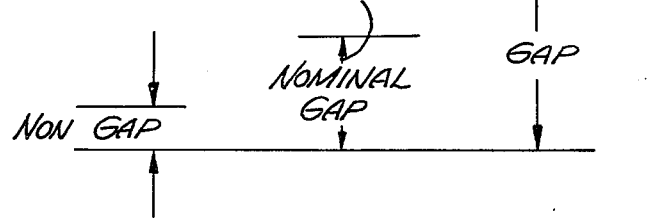
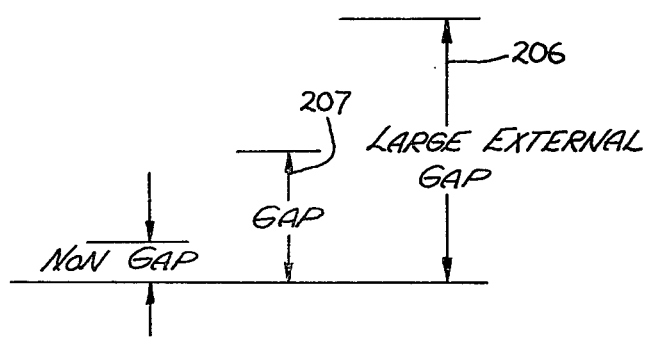
Fig. 10  FEATURE DETECTION-GAPS

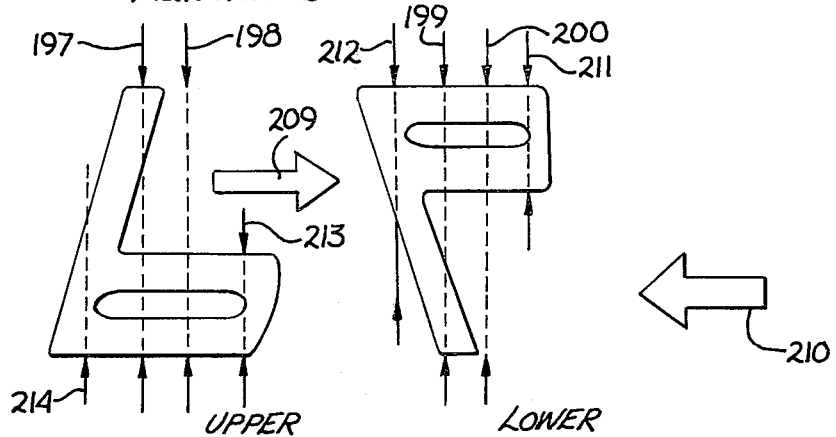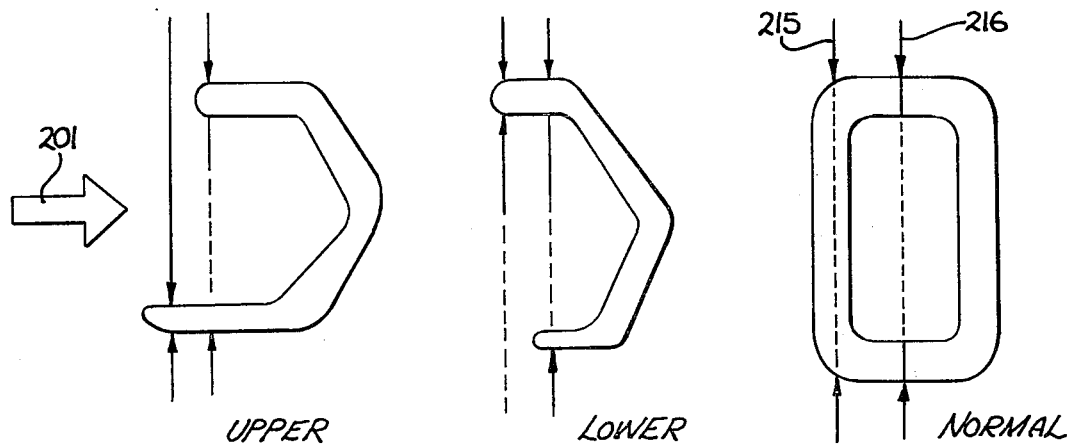
Fig. 11

FEATURE ENCODING
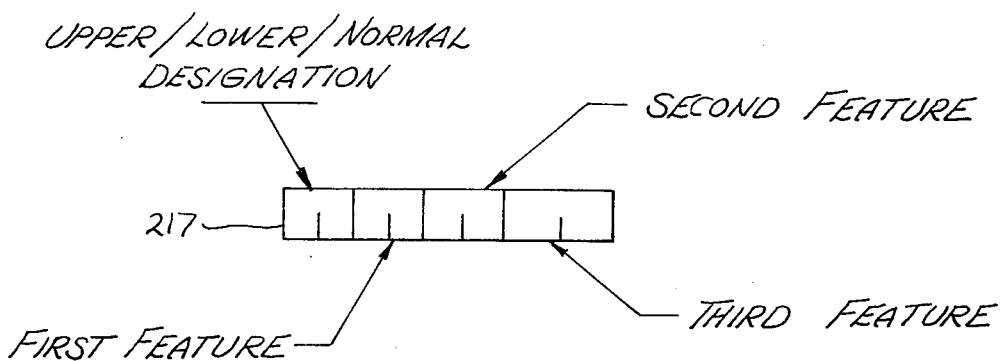
CODES
| | | | |
|---|---|---|---|
| | | NULL | 00 |
| | | GAP | 01 |
| NORMAL | 00 | STROKE | 10 |
| LOWER | 01 | BAR | 11 |
| UPPER | 10 | LARGE BAR | 111111 |
| | | LARGE (EXTERNAL) GAP | 0101 |
EXAMPLES
NORMAL/STROKE/BAR 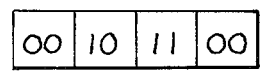
UPPER/STROKE/STROKE/STROKE 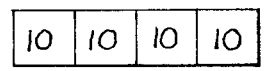
LOWER/BAR/GAP LARGE 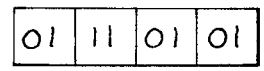
NORMAL/STROKE/GAP/STROKE 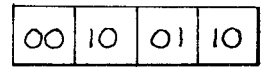
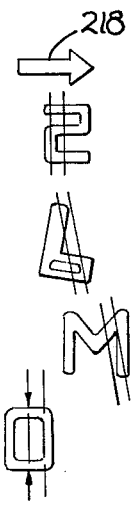
Fig. 12

AUTOMATIC LINE TRACKING
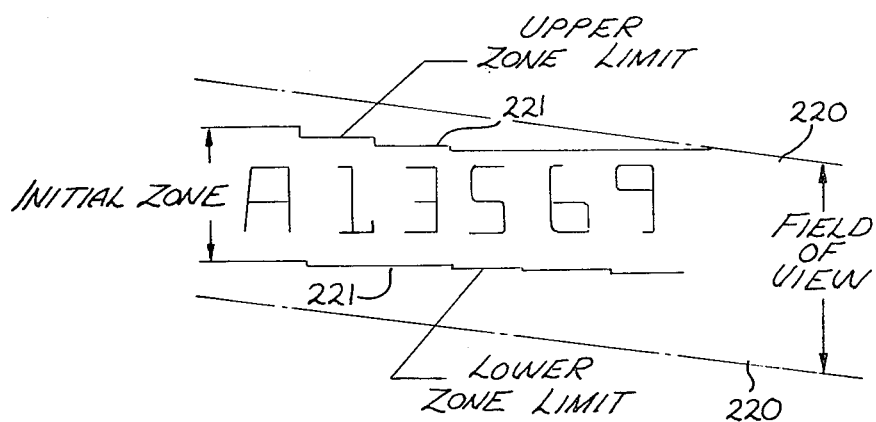
Fig. 13
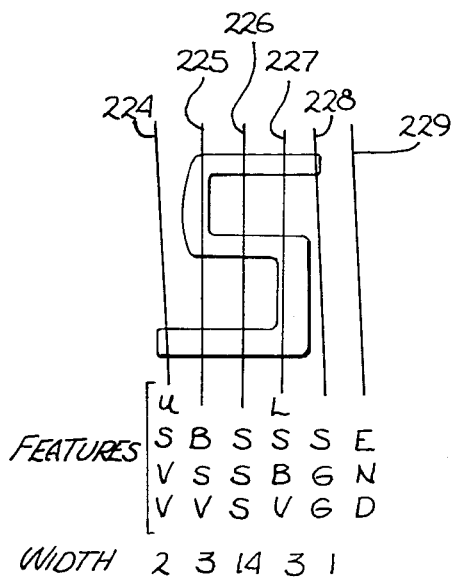
Fig. 14
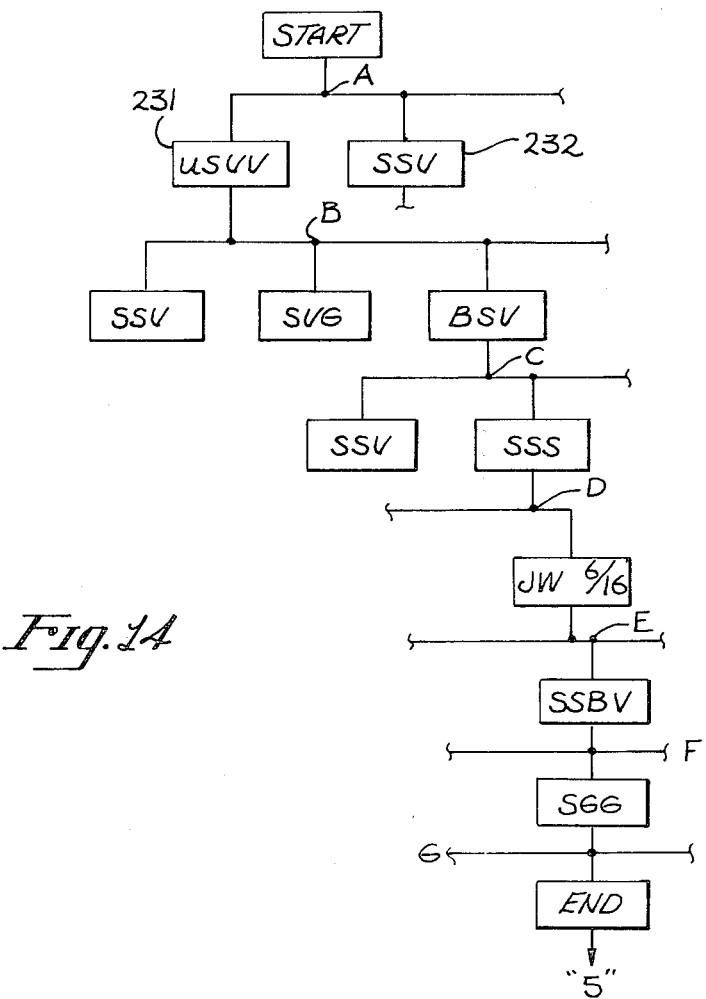

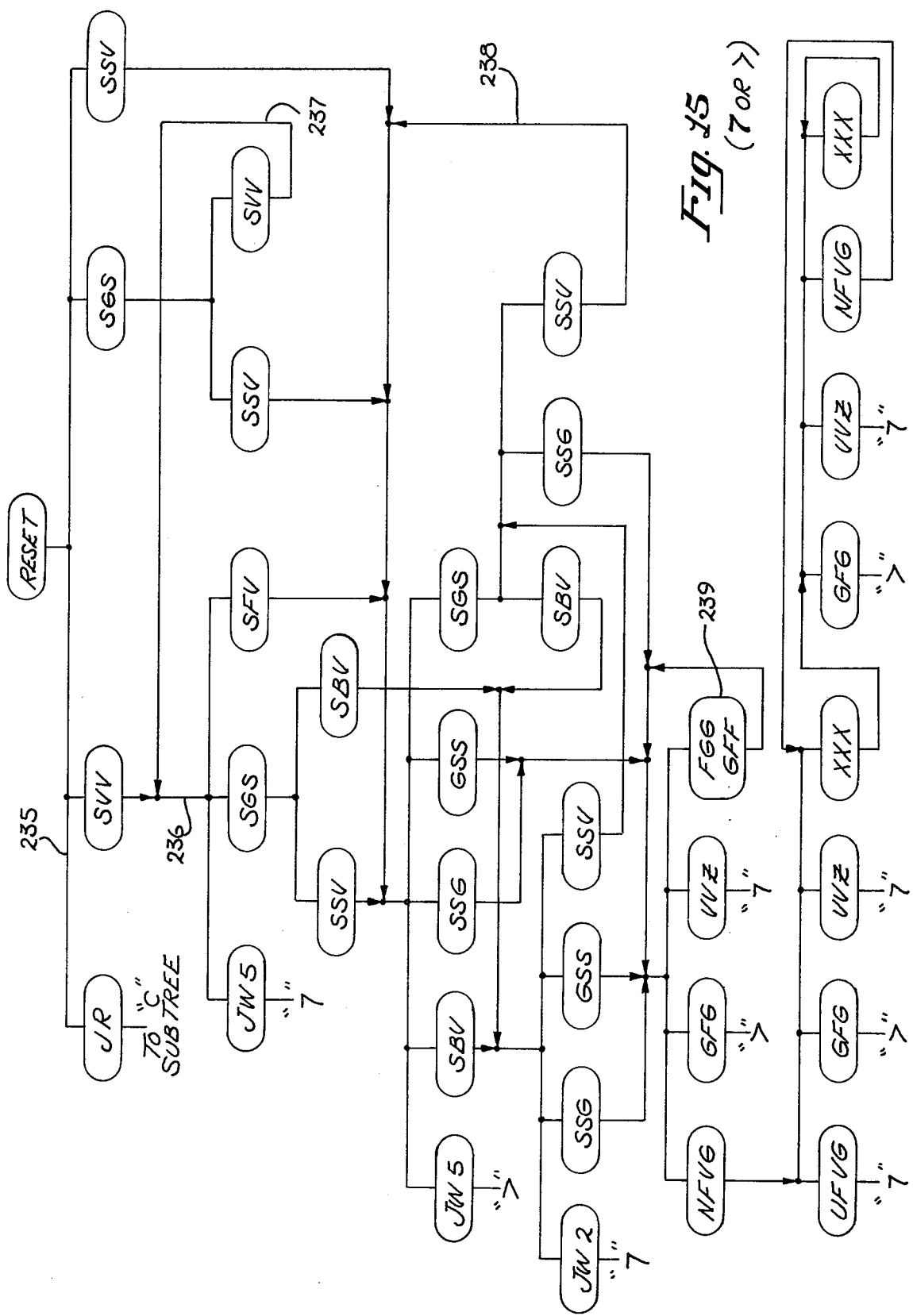

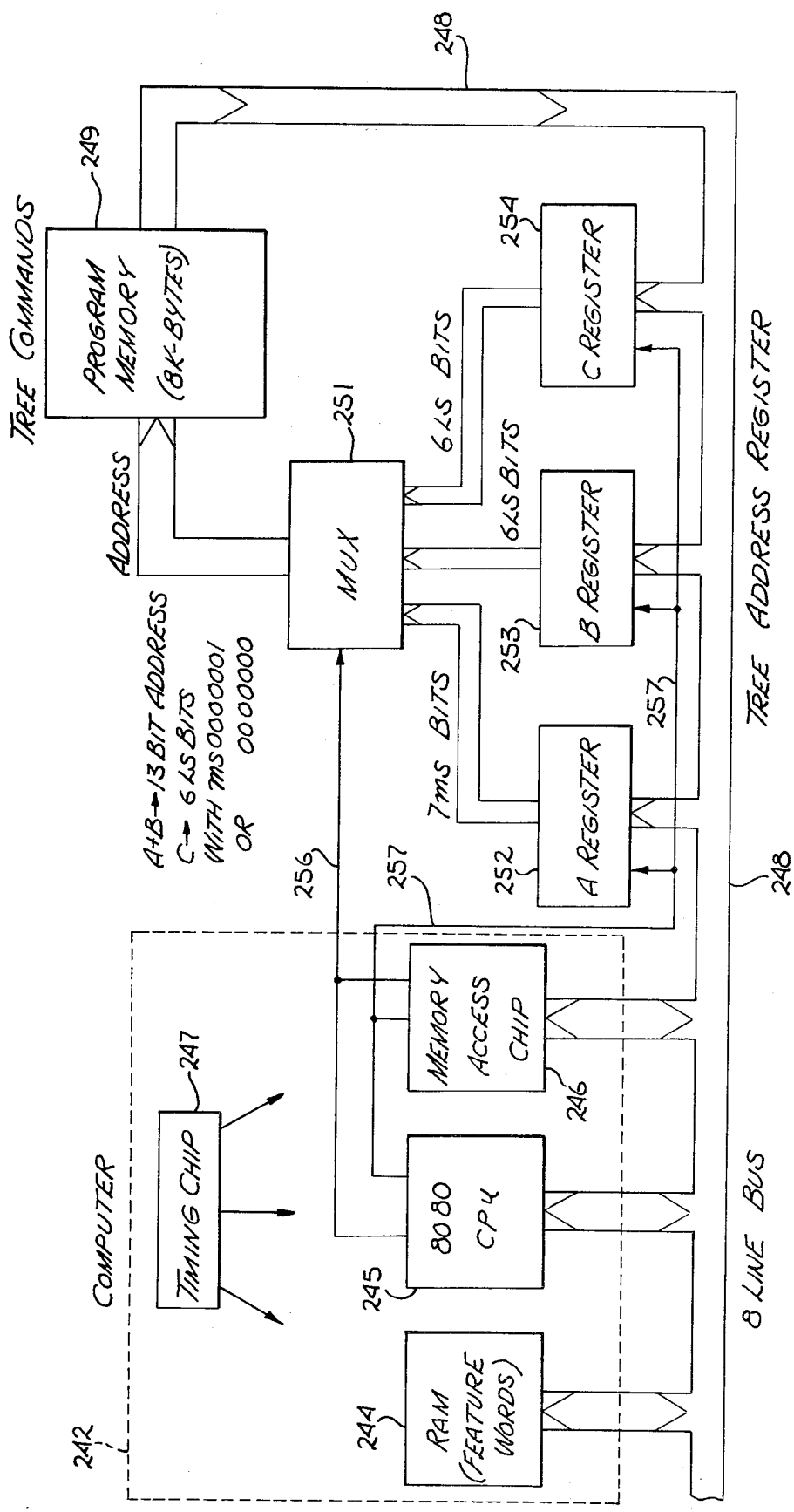

APPARATUS AND METHOD FOR RECOGNIZING CHARACTERS

BACKGROUND OF THE INVENTION:

1. Field of the Invention

The invention relates to the field of character recognition systems, U.S. Class 340/146.3.

2. Prior Art

There is a continuing demand for character recognition systems, particularly those which are able to discern ordinary printed alpha-numeric symbols. The most common approach to character recognition compares, in a two-dimensional array, the viewed characters with predetermined forms. Often this comparison proceeds by examining predetermined areas of the viewed character to determine if they are dark or light. This two-dimensional, sectional analysis is shown graphically in U.S. Pat. No. 3,964,022, FIGS. 9a-9f. This particular system employs a 32×32 self-scanned, photodiode array. The video data is digitized and then stored in an appropriate memory. One problem with this type of system is that in addition to requiring large memory storage, it attempts to handle all the information for a particular character at one time. That is, the entire two-dimensional array is considered at one time. This results in poor utilization of circuitry.

In U.S. Pat. No. 3,873,972 another character recognition system is disclosed. In this case, a linear array is employed for scanning the characters as shown in FIG. 2. However, the video information from this array is accumulated in the scratch-pad memory 42. Then both horizontal and vertical features are detected and used to identify characters. Thus, even though this system employs a linear array, it is again a two-dimensional matrix approach which also stores unprocessed video.

As will be described, with the invented apparatus and method the raw video data is not stored, but rather is analyzed as it is read from the linear array. The recognition of characters is done more in a "pipeline" manner which permits better utilization of the circuitry when compared to prior art approaches.

SUMMARY OF THE INVENTION

An optical reader for recognizing printed characters employing a hand-held wand, in the presently preferred embodiment, is described. The wand includes a four-diode-wide linear array which electrically scans the characters in vertical slices as the wand is moved across a field of characters. The video signals from these four channels are weighted to provide two channels of video data. Depending upon the horizontal direction of movement of the wanding across the characters, one of these channels is selected as the primary channel. The raw video data is first processed in a video processor which includes a dynamic thresholding means. This thresholding means provides compensation for the wide dynamic range of video signals received from the photodiode array. A feature analyzer is then employed to analyze the video signals in the primary channel for a plurality of predetermined features such as strokes, bars, large bars and gaps. A comparison of the video data in both the channels is made to determine the direction of character development (upper or lower). A digital word is encoded with the detected features for each scan. A state machine is next used to compare each word with the preceeding word to detect new words; each new word is stored in a first-in, first-out register. A logic tree-type analysis is conducted in a digital computer on each word from this register to determine the possible characters possessing the extracted features. As each word from the register is compared with words from the program memory, the possible number of characters having those features is narrowed until a single character is identified.

The apparatus also employs a zone control means for selecting a portion of the video information from each slice for processing. This zone control means compensates for the fact that in handwanding, the characters may not be in the center of the vertical field-of-view of the photodiode array. As the wand is moved from character to character, the zone control means determines where in the field-of-view the character is to appear, and then prevents the processing of data outside this zone.

BRIEF DESCRIPTION OF THE DRAWINGS

FIG. 1 is a general block diagram of the invented apparatus.

FIG. 2 is a flow chart illustrating the invented method for recognizing characters, which method is implemented by the apparatus of FIG. 1.

FIG. 3 is a block diagram of the video processor of FIG. 1.

FIG. 4 is an electrical schematic of a portion of the video processor of FIG. 3.

FIG. 9 graphically illustrates the detection of size features of characters.

FIG. 10 graphically illustrates the detection of gap features of characters.

FIG. 11 graphically illustrates the upper/lower feature detection.

FIG. 12 is a diagram illustrating the encoding of digital words with the detected features.

FIG. 13 is a diagram illustrating the changing field of view provided by the automatic line tracking means of the invented apparatus.

FIG. 14 graphically illustrates the functioning of the logic tree means of the invented apparatus in a general form.

FIG. 15 is a portion of the logic tree implemented in the recognition means of FIG. 1.

FIG. 16 is a block diagram of the presently preferred embodiment of the recognition means of FIG. 1.

Figure 5:
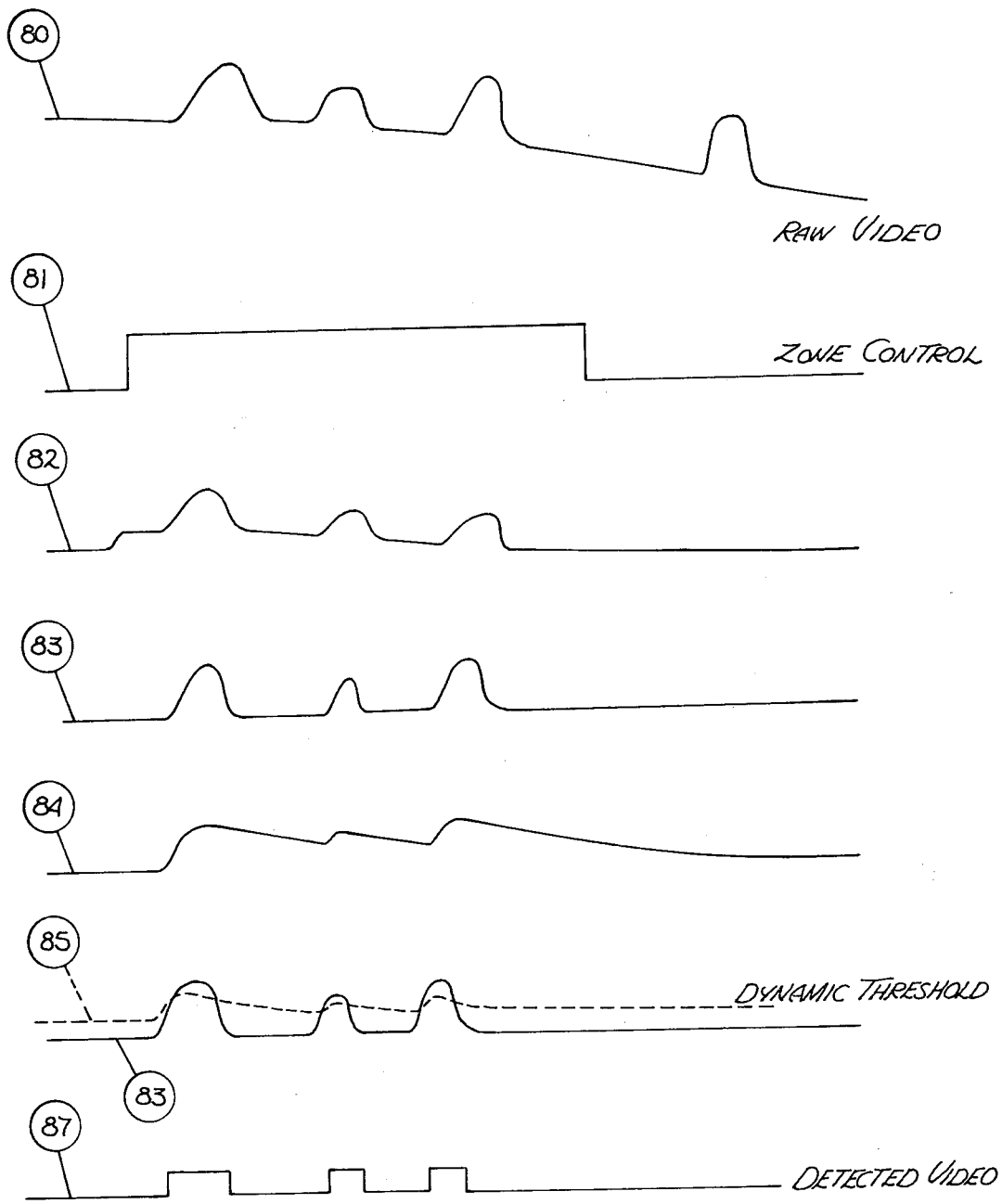
FIG. 5 is a graph of waveforms associated with the video processor of FIGS. 3 and 4.

DETAILED DESCRIPTION OF THE INVENTION:

An apparatus and method are described for recognizing characters such as alpha-numeric characters. As presently implemented, the apparatus and method are employed to recognize the standard OCR-A characters. However, it will be obvious to one skilled in the art that the apparatus and method taught by this application may be employed to recognized characters of other fonts.

In the following descriptions, numerous specific details are provided, such as specific numbers of divides, bits, etc., in order that the invented apparatus and method be thoroughly understood. It will be obvious to one skilled in the art, however, that the invented apparatus and method may be practiced without employing these specific details. In other instances, well-known components, techniques, etc., are not set forth in detail in order not to obscure the invention in unnecessary detail.

In the presently preferred embodiment, the characters such as alpha-numeric characters are scanned by a photodiode array which is contained within a hand-held wand. The wand is moved horizontally across a field of characters (in either direction) while the photodiode array is scanned to provide video signals representative of the viewed characters. In the presently preferred apparatus, the wand includes a light aligning means to assist the operator in aligning the wand with the field of characters. This light alinging means is described in copending application, Ser. No. 918,814, filed June 26, 1978 which is assigned to the assignee of this application. The invented apparatus and method may be employed with other than hand-held optical reading means, particularly those which provide relative motion between a photodiode array and the printed characters.

The wand includes incandescent bulbs which illuminate the characters. The reflected light from the characters is focused through a lens system onto the photodiode array. The photodiode array is electrically scanned to provide serial video signals. As best illustrated in FIG. 1, the photodiode array 22 is generally aligned vertically with respect to the characters such as character 20 (letter E). The movement of the wand provides relative motion in either the directions 28a or 28b. As will be explained in greater detail, automatic line tracking electrically locates the characters within the vertical field of view of the linear photodiode array 22. This field of view is shown by the dimension 23 of FIG. 1.

In the presently preferred embodiment, the photodiode array 22 consists of a 65×4 photodiode array which is commercially available from Reticon Corporation, Sunnyvale, California. This array is continuously scanned at a rate of approximately four microseconds per diode. Each scan or slice consists of 65 data cycles plus 2 dead time cycles giving a full cycle time of 268 microseconds per slice. The output of each of the sections of the array shown as lines 24, 25, 26 and 27 are coupled through amplifiers (not illustrated) to a video processor 30.

While in the presently preferred embodiment a four-diode-wide array is used, it will be apparent from the following disclosure that a one-dimensional array may be employed where the detection of movement is known. The use of the four-diode-wide array is primarily to improve the recognition reliability by compensating for typical printing imperfections. Also, while an electrically scanned photodiode array is used, other light sensing means may be employed. For example, light sensitive regions coupled to a charge-coupled device (CCD) provide an equivalent video signal by "reading" all the regions at the same time and then serially shifting out the sensed readings. In general, the video processor 30 first weighs the video signals on lines 24, 25, 26 and 27 to provide two channels of video data as will be described in conjunction with FIG. 3. Thresholding means including a dynamic thresholding means (described in detail in conjunction with FIG. 4) are then employed to provide a light/dark indication from the video signals.

The two channels of video data from the processor 30 are coupled to a feature processor 36 by lines 32 and 34. As will be explained in detail in conjunction with FIGS. 6, 7 and 8, and as explained graphically by FIGS. 9, 10, 11 and 12, predetermined features of a character are identified from the video data. These features are: stroke, bar, large bar, gap, large external gap and an upper/lower feature indicator. For each scan or slice of a character taken by the photodiode array, an 8-bit digital word is encoded with the detected features.

The digital words are employed in a logic tree means to recognize the characters. As each new word is received from the processor 36, the recognition means 38 compares the features with known features. The matching of the detected features with the stored features directs the flow in a logic tree so as to lead to the recognition of a single character.

In FIG. 2 the invented method is shown in general form. Block 45 illustrates that the characters are first scanned in the vertical direction. Each slice of each character is then examined to identify predetermined features such as stroke, bar, gap, etc., as shown by block 46. For each slice of a character, the identified features are encoded into an 8-bit digital word (feature word). This is shown by block 47. Each word is then compared with the previous word to identify new words. These new words are accumulated as shown by block 48. Note that in a typical application, as the wand is manually moved over the characters, a number of consecutive, identical feature words results.

The feature words are employed to direct a course in a logic tree as shown by block 49. The specific program for this tree is set forth in Table II.

Referring now to FIG. 3 and the block diagram of the video processor 30 of FIG. 1, the four lines of video signals from the photodiode array are coupled to weighting networks 50 and 51. Specifically, lines 24, 25 and 26 are connected to network 50 and lines 25, 26 and 27 are connected to network 51. The output of the network 50 provides one channel of video data designated as Channel A. A typical waveform of the raw video at the output of network 50 is shown in FIG. 5 as waveform 80. (References to the waveforms of FIG. 5 are shown in circles in FIGS. 3 and 4.) Within each of the networks 50 and 51, three lines of video signals are combined in an ordinary manner to provide a single channel of video. The weighting within these networks is done to provide smoothing and averaging of the signals received from the photodiode array.

The output of the network 51, designated as Channel B, is processed in a similar manner as the output of network 50 and results in an output signal from the processor 30 on line 34. For sake of clarity, only the blocks associated with Channel A are shown. In typical printed characters, numerous defects in terms of the consistency and density of the ink occur. Ink "voids" are detected as white areas by the photodiode array. By weighting the signals from three channels, compensation is provided for these defects. Similarly, excessive ink which appears on intended white areas causes unwanted detections. The weighting networks also compensate for these "spots."

The output of the weighting network 50 is coupled through a lowpass filter 53. The lowpass filter, which may be an ordinary filter, is employed to remove part of the DC component from the raw video signal.

The output of the lowpass filter 53 is coupled to a zone selector 54. The zone selector is used to couple a section of the video signal from each vertical scan or slice to line 57. The zone selector 54 receives a control signal on line 56; a typical waveform for this control signal is shown as waveform 81 of FIG. 5. A typical waveform at the output of selector 54 (line 52) is shown as waveform 82 of FIG. 5. An ordinary switching means may be employed for the zone selector 54. The generation of the zone control signal will be discussed, in detail, in conjunction with the automatic line tracking means.

The use of a multi-element photodiode array has the disadvantage of nonuniform sensitivity from element-to-element, and also from line-to-line. Moreover, such devices are often temperature sensitive, and thus drift. The DC level of the video signal tends to drift also because of the nonuniformity of the whiteness of the paper and the changes in the lighting levels from the incandescent bulbs used to illuminate the characters. The base line tracking circuit which includes amplifiers 58, 59 and 62, constant current source 60 and capacitor 61 substantially reduces the effects of these variations and also enhances the signal-to-noise ratio.

Line 57 is coupled through amplifier 58 to the constant current source 60, capacitor 61, and the input terminal of amplifier 59. The output of amplifier 59 is coupled to one input terminal of the amplifier 62. Line 57 is also coupled directly to the other input terminal of amplifier 62.

The amplifier 58 tracks the DC level on line 57. This amplifier has a relatively slow time constant, and thus does not track the data from the photodiodes contained on the DC level. Capacitor 61 is charged to the DC level tracked by the amplifier 58. The capacitor 61 is slowly discharged by the constant current source 60. The current source 60 enables the capacitor to track a negative signal by slowly discharging the capacitor at a constant rate. In this manner the capacitor may follow either a positive or negative signal. The charge on the capacitor 61 is buffered by the buffer amplifier 59. The DC level at the output of the buffer amplifier 59 is subtracted from the video signal on line 57 within the differencing amplifier 62 to provide the video signal less its DC component on line 64. The waveform of the signal at the output of the differencing amplifier 62 is shown as waveform 83 of FIG. 5.

The remainder of the circuitry of FIG. 3 is used to discern the difference between light or dark, that is, whether the photodiode is observing printing or the background paper. The signal on line 64 is applied to a threshold limiter 65 which establishes a general threshold level at node 75. The dynamic threshold limiter 66 is a faster reacting limiter, as will be described in greater detail in conjunction with FIG. 4, and provides a dynamic threshold level across the resistors 69 and 70. The common junction between these resistors is coupled to an input terminal of amplifier 71. Node 75 is also coupled to this terminal via the diode 68. The other input terminal to the amplifier 71 receives the signal on line 64. The output from the amplifier 71 is coupled to one input terminal of the AND gate 73. The other input terminal of the AND gate 73 is coupled to the output of an enabler 76.

In general, the thresholding circuit operates by comparing the dynamic threshold provided by limiter 66 with the signal on line 64. The limiter 65 provides a clamping voltage to the amplifier 71 to prevent the dynamic threshold from dropping below a predetermined level. The enabler 76 prevents output signals through the gate 73 when there is weak video; this prevents detection of noise.

Referring now to FIG. 4, the presently preferred embodiment of the thresholding means is shown in detail. Line 64 is again shown along with the output line 32. The dynamic threshold limiter 66 of FIG. 3 is realized as a medium speed peak follower. The signal on line 64 is coupled to one input terminal of a voltage comparator 89. The other input terminal of this comparator is coupled to its output, one input terminal of an operational amplifier 91, and to the collector terminal of transistor 95. The emitter terminal of transistor 95 is coupled to ground through a resistor 96 and a capacitor 99. The common junction between this resistor and capacitor is coupled to the base terminal of transistor 95 through a diode 98 and a resistor 97. This transistor terminal is also coupled to ground through a resistor. The output of the operational amplifier 91 is coupled to one of its input terminals and also to the voltage divider comprising resistors 69 and 70 which are also shown in FIG. 3.

The threshold limiter 65 of FIG. 3 is realized as a slow peak follower and includes a voltage comparator 88, one input terminal of which is coupled through a resistor to lines 64. The output terminal of the comparator 88 is coupled to the other input terminal of this comparator and to one input terminal of an operational amplifier 90 through an RC network. The output terminal of the amplifier 90 is coupled to the other of its input terminals, one input terminal of voltage comparator 92 and to a voltage divider network comprising resistors 101 and 102. The common junction between these two resistors is coupled through the diode 68 to the common junction between resistors 69 and 70.

The enabler 76 of FIG. 3 is fabricated from a comparator 92. The output terminal of the comparator is coupled to one input terminal of an NAND gate 106. The output of the amplifier is also fed back to its input terminal through the parallel combination of capacitor 108 and resistor 107. This input terminal is also biased through resistors 111 and 112.

The comparison function performed by the amplifier 71 of FIG. 3, in the presently preferred embodiment, is performed by voltage comparator 93 which has one of its input terminals coupled to receive the divided output from amplifier 91. The other input terminal to this comparator receives the signal from line 64; this input terminal is also coupled to the output of the amplifier through a feedback path consisting of the parallel combination of resistor 103 and capacitor 104. The output of the amplifier 93 is coupled to the other input terminal of the gate 106 through gate 105; gate 105 is connected to operate as an inverter.

In the presently preferred embodiment, the amplifiers 90 and 91 are commercially available operational amplifiers, in particular, Part No. TL 082 available from Texas Instruments. The voltage comparators 88, 92 and 93 are commercially available comparators, Part No. LM 339. The comparator 89 again is a commercially available part, Part No. LM 319. The resistors 69 and 70 have the value 4.32 K and 10 K, respectively.

The medium speed peak follower follows the peaks of the video signal as is best shown in FIG. 5 by the waveform 84. As may be seen, the follower is fairly responsive to the peaks of the waveform 83; however, after each peak, the output of the amplifier 91 begins to decay. The waveforms 83 and 84 are compared in comparator 93. The waveform 84 is shown as the dotted waveform 85 in FIG. 5, superimposed on the waveform 83 to show the manner in which the light/dark contrasts are detected. Note that the peaks of the video signal for the illustrated example exceed the dynamic threshold sufficiently to cause an output signal to occur. The output signal at gate 106 is shown as waveform 87 and is identified as the detected video signal.

The slow peak follower more slowly follows the peak levels of the video signal and provides a signal through the diode 68 to clamp the dynamic threshold to a minimum level to prevent the detection of noise when larger time intervals occur between peaks. When no signal is present, the enabler 76 through gate 106 prevents any signal from appearing on line 32, thus essentially turning off the channel to prevent the detection of random noise spikes which might otherwise be detected.

It should be mentioned that substantial variations typically occur in the black densities and background white densities. Because of this, the video signal can vary over a considerable dynamic range. The dynamic thresholding means above described compensates for this and permits the reliable detection of the dark/light areas.

The detected video signals for both Channels A and B, lines 32 and 34 respectively, are coupled to the feature processor 36. In the feature processor 36, the video waveforms are examined for each slice for the predetermined features. Before discussing the structure of the feature processor 36, the specific features extracted from the video signal, and the encoding of the feature words, shall be described in conjunction with FIGS. 9 through 12.

One of the features for which an examination is made is referred to in this application as "sizing" (FIG. 9). Sizing consists of an examination of the dark areas, that is, the printing, for its relative size in the vertical direction. Three separate sizes are detectable, in the presently preferred embodiment, and are identified as "stroke," "bar," and "large bar." A stroke is a relatively short, dark area; a bar, a longer dark area; and a large bar, a dark area which extends approximately the entire height of the character.

In examining slice 188, which is drawn through the large numeral 2 in FIG. 9, assume that this is a slice or scan of the numeral 2 observed by the photodiode array. The uppermost extending portion of the numeral 2 is relatively short, and is detected as a stroke. The lower portion is longer and is detected as a bar. For the slice 189, three relatively short dark areas are traversed, and thus a stroke/stroke/stroke is detected. Examining the numeral 9 shown in FIG. 9, the first slice through this numeral would result in the detection of a bar; the second, two strokes; and the last, a large bar. For the numeral 7, the one slice shown through this numeral will be detected as a stroke.

In FIG. 9, the relative threshold values for the stroke, bar and large bar are illustrated as amplitudes. The dimension 190 is the amplitude for a stroke; dimension 191, the amplitude for a bar; and the dimension 192, the amplitude for a large bar. Amplitudes smaller than 190 are discarded as noise. Note that while the threshold values for stroke, bar, and large bar are shown as amplitudes in FIG. 9, they are actually sensed in terms of time. That is, the video signal is examined and the duration of a dark image is sensed to determine if the image should be declared a stroke, bar or large bar. As will be discussed in greater detail, the duration is determined by the running of a digital counter which is stopped at the end of the dark image. The contents of the counter are then compared with the three possible threshold values to determine if the image qualifies as a stroke, bar or large bar.

A second set of featues for which the characters are examined is referred to in this application as "gaps." Two types of gaps are sensed. One is an internal gap, which is shown by slice 194 in the letter O of FIG. 10. The other is a large external gap such as the one shown for the letter U, slice 201.

Examining the slice 193 which passes through the letter P, the relatively short gap between the two strokes is ignored, in the presently preferred embodiment. Referring to the internal gap threshold values shown in FIG. 10, the gap traversed by slice 193 is referred to as a "nominal" gap, dimension 204. The slice 194 through the letter O includes two strokes, however, this time separated by a larger gap. This larger internal gap is detected and categorized as a feature. The threshold for this gap is shown by the dimension 205 in FIG. 10.

In the letter M of FIG. 10, the slice 195 first encounters a stroke at the upper part of the letter, then a relatively long light region which is classified as a large, external gap. The relative threshold for this gap is shown by dimension 206 in FIG. 9. The second slice 196 through the letter M first encounters a short gap at the upper part of the letter, then a stroke, and then another gap. This second gap is not large enough to qualify as a large external gap, but rather is detected as a gap. The threshold level for the external gaps are shown by dimensions 206 and 207. Note that the threshold level for an external gap is lower than the threshold level for an internal gap (compare dimensions 205 and 207.) However, for purposes of feature extraction, these two gaps are considered alike. In the last example shown in FIG. 10, the slice 201 through the letter U first encounters a large gap, followed by a stroke.

As in the case of sizing the dark areas, the gap thresholds represent time. The duration of the light areas is sensed in a digital counter and compared with stored values, as will be explained later.

The third type of feature extracted from the video signal is shown in FIG. 11; this feature is an indication of the direction of character development. It should be noted that for the sizing and gap feature extraction, the information from only a single channel is employed. For the direction of character development, the information from both channels is compared.

Referring first to the numeral 6, two slices 197 and 198 are shown. Assume that the direction of travel of the photodiode array is indicated by arrow 209, and that the primary channel is the trailing channel (slice 197). Slice 197 shows a stroke/stroke/stroke; slice 198, a stroke/stroke. When the data from these two channels are compared on a common time axis, it can be determined that the upper part of the character is not sensed by slice 198. The character must thus have some upwardly extending feature. This is declared an "upper" feature. Examining the letter P and the slices 199 and 200, a stroke/stroke/stroke of the primary channel is compared with a stroke/stroke of the future channel. The common time axis comparison indicates that a feature has been lost in the lower part of the letter. This is declared a "lower" feature. Two examples are shown in FIG. 11 with variations on the backward letter C.

Again, assuming that the wand is moving in the direction indicated by arrow 201, the first case results in an upper feature indication and the second, in a lower feature indication. In the case of the letter O of FIG. 11, slice 215 shows a large bar, and slice 216, a stroke/gap/stroke. By comparing these two sets of features, it is apparent that features are developing on both the upper and lower part of the character. This is declared "normal."

The value of the upper/lower feature can be shown by an example. Assume that the wand is traveling in the direction indicated by the arrow 210, and that four slices 211, 200, 199 and 212 are made through the letter P. The feature detection results in: bar; stroke/stroke; stroke/stroke/stroke; and bar. Assume that four slices 213, 198, 197 and 214 occur through the numeral 6. The resultant feature detection at these four slices is: bar; stroke/stroke; stroke/stroke/stroke; and bar. (No gaps are detected for either of the last two examples.) Note that the detected features are the same for both the 6 and P. Thus, the feature detection without the upper/lower determination is ambiguous for some characters. With the upper/lower feature determination, the difference between a 6 or P, in addition to other ambiguous cases, may be discerned.

A single channel of video data may be used for the upper/lower feature determination. This may be done by storing the video signal from slice-to-slice and comparing them with one another. However, more precision is obtained by using two channels since the precise spacing between the diodes is known.

For each slice through a character, the feature processor 36 of FIG. 1 encodes an 8-bit word with the detected features. As shown in FIG. 12 by the 8-bit word 217, the first two bits are employed for the upper/lower/normal designation with the codes indicated; 00 for normal, 01 for lower, and 10 for upper. The second two bits are used to designate the first feature, the next two bits, the second feature, and the remaining two bits, the third feature. The features are coded as indicated; null or void as 00, gap as 01, stroke as 10, and bar as 11. Since three bars cannot occur in a single slice, the 111111 code is used for a large bar. Also, since the two consecutive gaps cannot be detected, the 0101 code is used to designate a large (external) gap. Four examples are shown in FIG. 12. Note in each case, it is assumed that the direction of travel is as indicated by arrow 218, and that the trailing slice is the primary slice.

The features for the above described coding are furnished to the register 146 of FIG. 6 as will be described in greater detail.

The above-described features have been selected as a result of an empirical analysis. However, other features could be substituted for those employed in the presently preferred embodiment, such as the small gaps.

Figure 6:
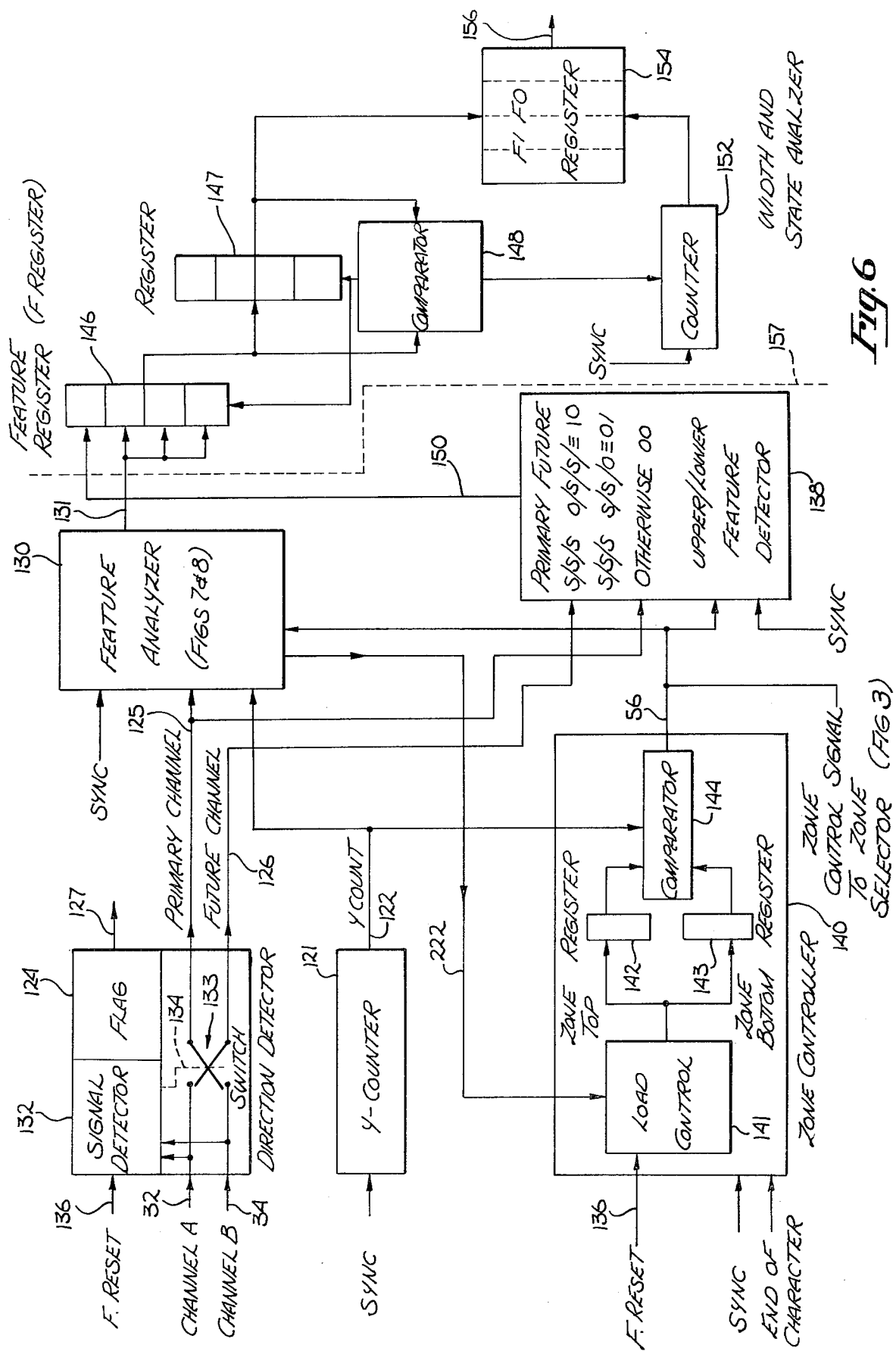
FIG. 6 is a block diagram of the feature processor of FIG. 1.

Referring now to FIG. 6, the major portions of the feature processor 36 of FIG. 1 include a direction detector 124, feature analyzer 130, Y-counter 121, zone controller 140, upper/lower feature detector 139, and the circuitry to the right of the dotted line 157, identified as the width and state analyzer.

In the presently preferred embodiment, the wand may be moved in either direction across a field of characters. The direction detector 124 determines the direction in which the wand is moving. The detector 124 receives the video signals from the video processor 30 on lines 32 and 34. This detector also receives a field reset signal on line 136; this signal is generated at the end of an entire field of characters. The signal detector 132, which is a part of the direction detector, receives the data on lines 32 and 34 and determines on which line the video signals first appear. An ordinary bistable circuit may be employed for detector 132. As soon as this determination is made, a flag 124 is set and a signal applied to line 127 to indicate the direction of the wand over the characters. This signal is used within the logic tree means and is crucial in recognizing certain characters. For example, the difference between a "3" and a "E" is determined by the direction of travel of the wand.

The signal detector 132 sets a switch 133 as indicated by the dotted line 134. The switch is set immediately upon the determination of the direction. For the presently preferred embodiment, the leading channel is coupled to line 126 and is identified as the "future" channel and the trailing channel is coupled to line 125 and is identified as the "primary" channel. The video signals in the primary channel (line 125) are coupled to the feature analyzer which detects the bars, strokes and gaps. The primary channel and the future channel are coupled to the upper/lower feature detector 138 which detects the upper/lower feature.

The Y-counter 121 provides a digital count corresponding to the diode in the array which is being interrogated. In the presently preferred embodiment where a four-diode-wide array is used, four horizontally aligned diodes are simultaneously interrogated at each count. The Y-count provides Y-position information since when it is compared with the video signal, the Y-position of the detected light/dark region is known. The Y-count is coupled on line 122 to the feature analyzer 130 and to the comparator 144 which is included within the zone controller 140. An ordinary digital counter may be employed for counter 121.

Before describing the struccture and operation of the zone controller 140, an understanding of its function is helpful; for this purpose, reference is now made to FIG. 13. The zone controller permits the automatic line tracking which is of particular value in the case of a hand-held wand. As the hand-held wand is moved over a field of characters such as the field shown in FIG. 13, the field-of-view of the wand (as defined by the parallel lines 220) may not remain parallel to the characters. In fact, misalignment is more apt to occur than not. The automatic line tracking provided by the zone controller 140 assures the selection of that portion of the video signal which contains the pertinent character data.

For the initial character in the field-of-view, such as the letter A shown in FIG. 13, it is assumed that the character is centered within the field-of-view as shown. At the end of the first character, a determination is made on the location of the character within the field of view. An adjustment is then made by the zone controller to select a different portion of the video signal for processing. This is done by establishing a new distance between the upper and lower edge of the field-of-view and the upper and lower zone limits shown as lines 221. As the field of characters moves either up or down within the field-of-view, the zone limits automatically track that movement.

The zone controller 140 includes a load control means 141 which loads digital numbers into either a register 142 or a register 143. The contents of registers 142 and 143 are compared in a digital comparator 144 with the Y-count provided on line 122. When the contents of register 142 matches the Y-count, the top of the zone has been reached, and a signal on line 56 so indicates. When the contents of register 143 matches the Y-count, the comparator 144 terminates the zone by removing the signal from line 56. The load control means 141 receives the field reset signal on line 136. When the signal is originally received, the load control means 141 loads the numbers into registers 142 and 143 which assume that the first character will be centered within the field-of-view. The maximum height of the characters is known; the height of the zone is this known height, plus an additional margin (6 counts on top and bottom as implemented). Thus as is best seen in FIG. 13, the letter A is within the initial zone, which zone includes a space above and below the letter A. For each character, the feature analyzer 130 provides a count (on line 222) indicating the upper and lower limits of the character plus the set margins. These numbers are loaded into registers 142 and 143 at the end of each character. Thus for each slice, the comparator 144 is able to provide a zone control signal. While in the presently preferred embodiment the zone limits are, in effect, updated for each character, they may be updated more frequently or less frequently.

Figure 7:
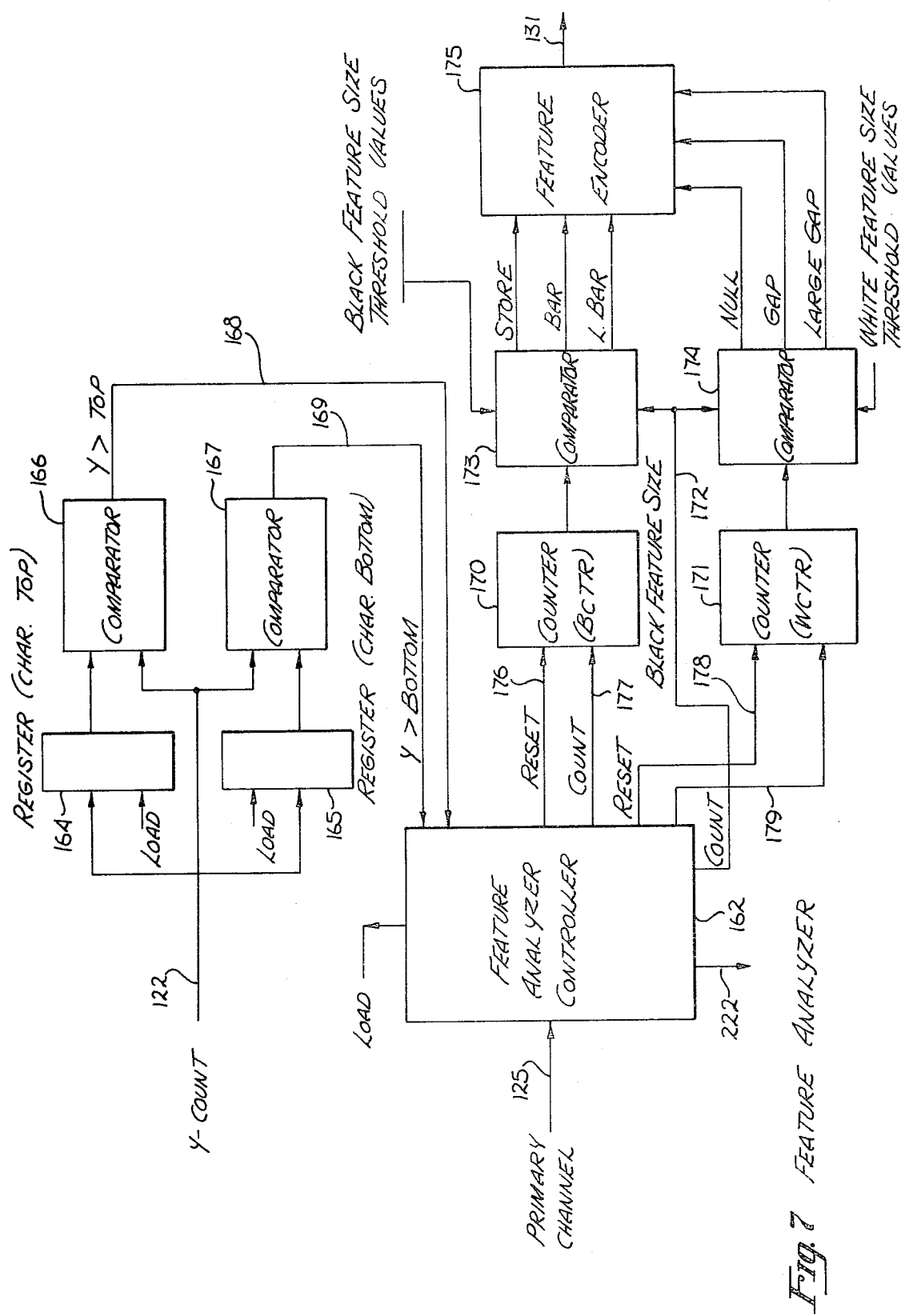
FIG. 7 is a block diagram of the feature analyzer portion of the processor of FIG. 6.
Figure 8:
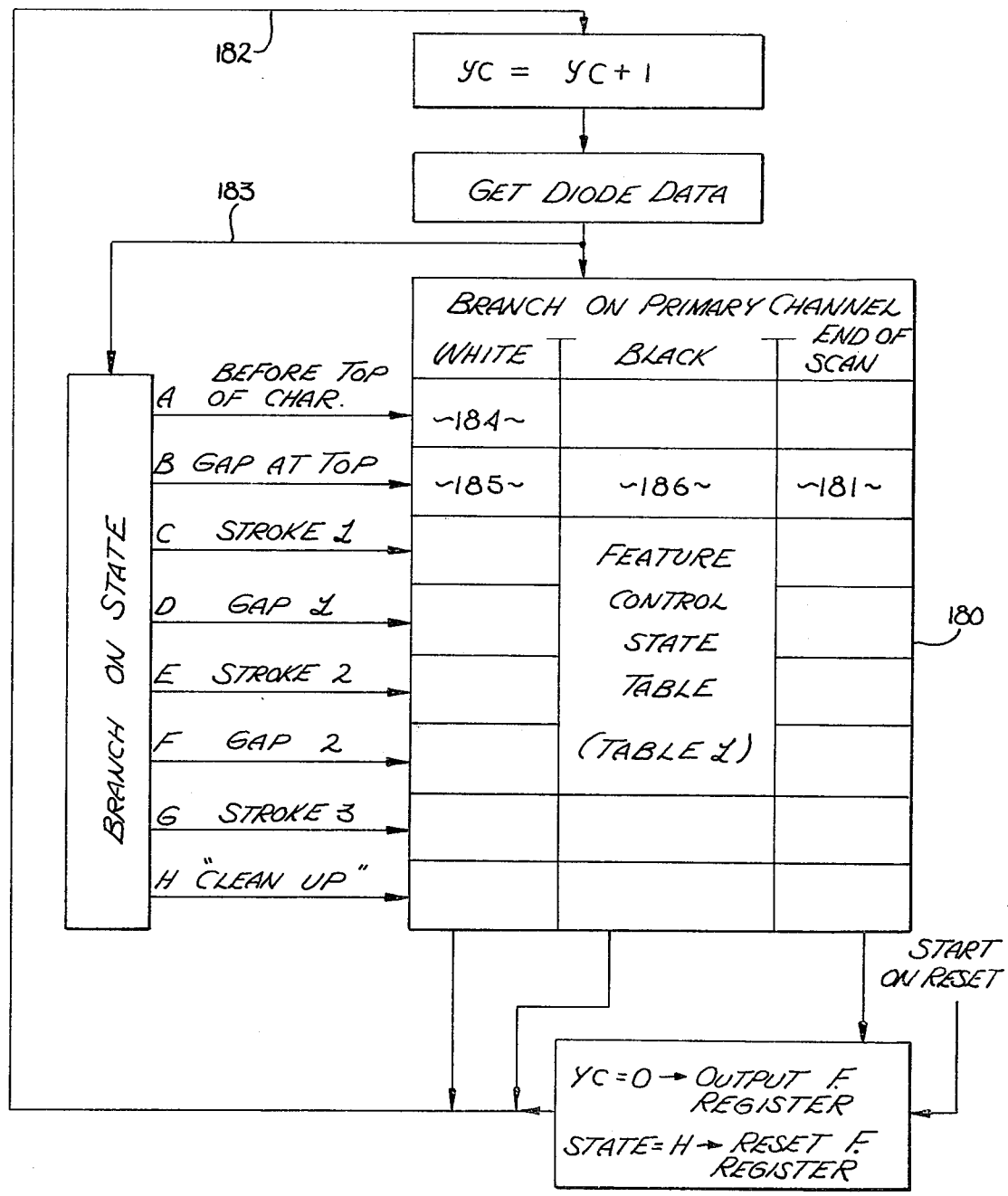
FIG. 8 is a flow chart of the logic implemented by the feature analyzer of FIG. 7.

The circuit for the feature analyzer 130 of FIG. 6 is described in conjunction with FIGS. 7 and 8 and Table 1. The upper/lower feature detector 138 may be fabricated employing the same general logic which will be discussed for analyzer 130 or by employing well-known circuit designs. Two of the possible conditions of the primary and future channels are shown within the block representing detector 138 along with the resultant coding. The other possible conditions are apparent from considering FIG. 11.

The 8-bit digital words (feature words) are coupled from the feature analyzer 130 and the upper/lower feature detector 138 into the feature register (F register) 146. The 2 bits for the upper/lower designation are coupled on line 150 to the first two stages of this register; the remaining 6 bits are coupled on line 131 to the other six stages. The contents of the register 146 are shifted (on command from comparator 148) to an 8-bit register 147. The contents of the registers 146 and 147 are compared by the comparator 148. The contents of the register 147 are shifted (on command from comparator 148) into a first-in/first-out (FIFO) register 154. The register 154 is able to store 8-bit words from the register 147 in addition to the other information as will be discussed. (In the presently preferred embodiment, register 147 is 12 bits wide and 64 bits deep.) The comparator 148 is coupled to a digital counter 152 which counts at the rate of the scans. Each time a word is shifted by the comparator, the counter 152 is reset.

In operation, assume that a digital word encoded with the features detected from the first slice of a character is in register 146. The contents of this word are compared with the contents of register 147. Since the contents of this register are cleared at the beginning of each character, the comparator indicates a difference between the word contained within register 146 and the "blank" contained within register 147. The word in register 146 is shifted into register 147. When this shift occurs, the comparator 148 resets counter 152. The feature word from the second slice is next placed within the register 146. This word is compared with the first digital word now stored in register 147. If the words are the same, no shifting occurs. In practice, the same feature word occurs a number of times and this number is determined by counter 152. When the contents of register 146 are different from those in register 147, the comparator 148 detects this difference and shifts the word from register 147 (along with the contents of counter 152) into the FIFO register 154 and also shifts the contents of register 146 into register 147. Thus register 154 receives each new feature word along with a count which indicates the relative width of the encoded feature.

The contents of the register 156 represent the video data in a condensed, digital form. Note, no storage of video data occurs. In fact, the video data is analyzed for features in a serial or peripheral manner as it occurs. In the presently preferred embodiment, the feature words are removed in a first-in/first-out basis on line 156 as fast as they may be processed by the recognition means of FIG. 1. This digital information, however, may be stored for other uses. For example, it may be stored or transmitted with the recognition analysis performed at a later time or at a different location. The data from the register may be employed to provide a visual display of the characters without recognition of the characters. This may be done by using the information from the words to display strokes, gaps, bars, etc.

Referring to FIG. 7, the block diagram of the feature analyzer, the upper part of the diagram includes a pair of registers 164 and 165. These registers are coupled to the comparators 166 and 167, respectively. The Y-count on line 122 is also coupled to these comparators. At the beginning of each character, register 164 is loaded with the digital number representing the anticipated top of the character and register 165, with the number representing the anticipated bottom. For the first character of the frame as shown in FIG. 13, it is assumed that the character will be centered within the field-of-view. When the Y-count is greater than the number stored within register 164, a signal is present on line 168. When the Y-count is greater than the number stored within register 165, a signal appears on line 169. The use of these signals is discussed in conjunction with FIG. 8.

The actual detection of the strokes, bars, large bars, gaps and large gaps are made by counting the number of "light" or "dark" diodes and then comparing this number with the threshold values shown graphically in FIGS. 9 and 10. In FIG. 7, counter 170 is the black feature size counter which is referred to in FIG. 8 and Table 1 as "BCTR". This ordinary digital counter counts upon receiving a signal on line 177, and is reset when receiving a signal on 176. The contents of the counter are coupled to a comparator 173. The predetermined threshold values for stroke, bar and large bar are also coupled to this comparator. The controller 162 senses the presence of either a dark or light region from the primary channel video signals. If a dark region is encountered, counter 170 is caused to count. When the dark region ceases to be detected, the count is compared with the various threshold levels by comparator 173. An appropriate signal is then coupled to the feature encoder 175 indicating a stroke, bar, etc.

The gap detection employs a digital counter 171 which is referred to in FIG. 8 and Table I as "WCTR". The contents of this counter are coupled to a comparator 174 as are the threshold values shown in FIG. 10 for gaps. When a light region is sensed, the counter 171 begins to count under the control of a signal received on line 179 from the controller 162. When the light region is no longer sensed, the count in the counter 171 is compared with the threshold values to determine whether a null, gap or large gap has been detected. The counter 171 is then reset by a signal provided on line 178. An appropriate signal is coupled to the encoder 175 to indicate whether a null, gap or large gap has been detected. In the case of gap detection, it is necessary to also know whether strokes or bars have previously been detected in order to declare the proper gap (because of the different thresholds for internal and external gaps). The logic to accomplish this is described in conjunction with FIG. 8.

The feature encoder 175 may be an ordinary encoding means for implementing the coding shown in FIG. 12.

The logic implemented by the feature analyzer controller 162 of FIG. 7 is best understood from the flowchart of FIG. 8. The feature control state (table of FIG. 8) is set forth below in the Specification as Table I. A one-to-one layout exists between the table of FIG. 8 and Table I. For example, block 184 is the upper lefthand block of Table I. The possible branches in FIG. 8 (A through H) are also shown in Table I. In implementing the logic set forth in Table I, each of the blocks, such as blocks 184, 185, 186 and 181, controls the counters 170 (BCTR) and 171 (WCTR) of FIG. 7. Furthermore, each block is capable of performing the comparison test indicated in that block and is able to provide direction to the next appropriate block. Note that the first two bits of the feature word in Table I use the code 11 to indicate an idle state or an error.

Assume that a scan is initiated (YC=0). With YC=0 and commencing on line 182, the first count occurs and the information from the first diode is obtained. Following along line 183, in every case for the first diode, branching occurs on Branch A which is designated "Before Top of Character". If the first diode senses a light region, then the information in block 184 applies. With YC>Y TOP, which is indicated by the signal on line 168 of FIG. 7, branching occurs to Branch B and a WCTR reset occurs (see Table I). Then, if the second diode senses a light region, the WCTR counter is advanced (block 185). On the other hand, if the second diode or a subsequent diode senses a dark region (block 186), the BCTR counter is set and the contents of the WCTR counter are examined. If the contents of that counter are less than 2, it is assumed that no gap occurred at the upper part of the character. If the contents of that counter are between 2 and 5, it is assumed that a gap occurred. Referring to FIG. 12, the second and third bits are set to 01. By continuing in this manner for each slice, the first, second and third features shown in FIG. 12 are determined. Block 181, as shown in Table I, implements the setting of the zone top and zone bottom. The appropriate counts are loaded into registers 142 and 143 of FIG. 6 by line 222.

TABLE I

The following notations are used in Table I:
 YC = Y-Count (line 122, FIG. 6)
 Y TOP = Count in register 164, FIG. 7
 Y BOT = Count in register 165, FIG. 7
 BCTR = Counter Control for Counter 170, FIG. 7
 WCTR = Counter Control for Counter 171, FIG. 7

| INPUT STATE | PRIMARY CHANNEL WHITE | PRIMARY CHANNEL BLACK | END OF SCAN |
|---|---|---|---|
| Before Y TOP --A-- | If YC>Y TOP then Reset WCTR  Next State = B | If YC<Y TOP then Load Y TOP with YC  Reset BCTR Next State = C | Set F Register = "Idle", which is "11000000" |
| Possible Gap at Top of Character --B-- | Count WCTR | Reset BCTR  If WCTR<2 (no gap) then Next State = C  If 2≦WCTR<5 (gap at top) then F = "00010000" Next State = E  If 5≦WCTR<12 then F = "00010100" Next State = G (Balance Graph Error)  If 12≦WCTR then F = "11000001" Next State = H | Set F Register = "End of Character" which is "00000000"  Set Zone Top = Y TOP − 6  Set Zone Bot = Y BOT + 6 |
| First Stroke --C-- | Reset WCTR  IF BCTR<5 (stroke) then F = "00100000" Next State = D  If 5≦BCTR<9 (bar) then F = "00110000" Next State = D  If 9<BCTR (large bar) then F = "00111111" Next State = H | If YC>Y BOT then Y BOT = YC  Count BCTR | Set F Register = "Error", which is "11000011" |
| First Gap After Stroke --D-- | Count WCTR  If YC>Y BOT then DO  If WCTR<2 (no | Reset BCTR  If WCTR<5 (no gap) then Next State = E  If 5≦WCTR (inner | Set F Register = "Error", which is "11000011" |

TABLE I-continued

The following notations are used in Table I:
- YC = Y-Count (line 122, FIG. 6)
- Y TOP = Count in register 164, FIG. 7
- Y BOT = Count in register 165, FIG. 7
- BCTR = Counter Control for Counter 170, FIG. 7
- WCTR = Counter Control for Counter 171, FIG. 7

| INPUT STATE | PRIMARY CHANNEL WHITE | PRIMARY CHANNEL BLACK | END OF SCAN |
|---|---|---|---|
| | bottom gap) then<br>Next State = H<br><br>If 2≦WCTR<5<br>(bottom gap) then<br>F = F or "00000001"<br>Next State = H<br>If 5≦WCTR (double bottom gap) then<br>F = F or "00000101"<br>Next State = H<br>End | gap) then F = F<br>or "00000100"<br>Next State = G | |
| Second Stroke<br><br>--E-- | Reset WCTR<br><br>If BCTR<5 (stroke)<br>then F = F or<br>"00001000"<br>Next State = F<br>If 5≦BCTR (bar)<br>then F = F or<br>"00001100"<br>Next State = F | If YC>Y BOT then<br>Y BOT = YC<br><br>Count BCTR | Set F Register=<br>"Error", which is<br>"11000011" |
| Gap After Second Stroke<br><br>--F-- | Count WCTR<br><br>If YC>Y BOT then<br>DO<br>If WCTR<2 (no bottom gap) then<br>Next State = H<br><br>If 2≦WCTR (bottom gap) then F = F<br>or "00000001"<br>Next State = H<br>End | Reset BCTR<br><br>If WCTR<5 (no gap)<br>then Next State = G<br>If 5≦WCTR (error case) then<br>F = "11000011"<br>Next State = H | Set F Register =<br>"Error", which is<br>"11000011" |
| Third Stroke<br><br>--G-- | If BCTR<5 (stroke)<br>then F = F or<br>"00000010"<br>Next State = H<br>If 5≦BCTR (bar)<br>then F = F or<br>"00000011"<br>Next State = H | If YC>Y BOT then<br>Y BOT = YC<br><br>Count BCTR | Set F = "Error",<br>which is<br>"11000011" |
| Wait to End of Scan<br>--H-- | No Operation | No Operation | No Operation |

The presently preferred embodiment for the feature processor described above is a hardware embodiment; however, the processor may be, and in fact has been, realized with a digital computer.

The recognition means which implements the logic tree, in the presently preferred embodiment, is implemented with a digital computer, specifically, a commercially available microcomputer sold under the Part No. 8080. The programming of this computer shall be described in detail.

It is possible for each of the new feature words stored within the FIFO register to be employed in the logic tree analysis as it is generated. However, in the presently preferred embodiment, the width count for each word is used to compute a normalized width which is independent of the rate at which the wand is moved over the characters. The feature words, along with the normalized width, are stored in a feature buffer. The logic tree is generally implemented by taking feature words from the feature buffer (in the same order that they are formed) and then comparing them with stored words. As a match occurs with a stored word, it determines the next subtree or branch in most areas. The feature words, which are removed one by one from the feature buffer, provide one input in the comparison process used with a selected tree operating code taken from a tree network or a table of tree commands. The current tree address is used to select the output that is employed in the tree analysis. More specifically the tree analysis consists of selecting a new tree command which is combined with a conditional advance to the next feature word in the feature buffer. At the completion of the recognition analysis, an output code is provided that indicates the character that has been selected.

An example of this process is shown in FIG. 14. The numeral 5 is shown with slices 224 through 229. Only those slices that provided a new word are shown in FIG. 14. Slice 224 results in the detection of the features upper/stroke/void (null)/void. This word has a relative width of 2 on a normalized basis. The next feature word consists of bar/stroke/void (width of 3). These features are extracted at slice 225. At slice 226, the predominant feature of this character which has a width of 14 occurs (stroke/stroke/stroke). At slice 227, the features lower/stroke/bar/void with a width of 3 is detected; and, finally at slice 228, stroke/gap/gap with a width of 1 is detected. At slice 229, the end of the character has been reached and no features are detected. Note that the slices 224 through 229 are not parallel; they more closely resemble the slices which actually occur with a hand-held wand.

Referring now to the partial logic tree shown in FIG. 14, as the analysis begins, commands are accessed at the starting point shown as node A. The first feature word in the feature buffer, specifically U/S/V/V, is compared with each of the stored words leading from node A, such as those shown in blocks 231 and 232. When this first feature word is compared with the word in block 231, a match occurs. No comparison is then made with the word shown in Block 232 or any of the other words leading directly from node A. Since a match occurred at block 231, the tree address is now changed to node B. At node B, the first comparison is made to determine if the second feature word from the feature buffer, (B/S/V), compares favorably with S/S/V. Since the comparison fails, the second feature word is next compared with S/V/G, and again, there is no match. In each case, the next operating code is selected, but the feature word does not change because a match has not occurred. When the next match occurs, the new address for node C is selected and placed in the current tree address register. This analysis continues from node C to node D with a match of the word S/S/S. When the tree address is changed to node D, a test is made to determine the width of the S/S/S feature. The "JW" is a code meaning "jump if the width is greater than shown." Specifically, the width 14 is examined to determine if the width is at least 6/16's of the total width of the character. Since it is, the address for node E is selected. Following this, two additional tests are made to examine the end of the character. At the end of these tests, the character is declared a "5". These end tests are generally used to confirm a particular character, rather than to recognize it. For example, if the photodiode array was truly parallel with the numeral "5," the last feature word S/G/G may not have occurred. In this case, the character would still have been declared a "5," however, without proceeding to node G, but rather from node F.

In FIG. 15 a portion of the actual logic tree is shown, specifically the subtree used to discern the difference between a "7" and a "fill" symbol (the greater than symbol). At node 235, the stored words with which the next feature word are compared are shown. (The notation "JR" indicates "jump reverse.") If, by way of example, a match occurs with S/V/V, the address for node 236 is selected. Note that at that node, if the normalized width is greater than 5, the character is declared a "7."

In the presently preferred implementation, the analysis does not always proceed forward, but rather in some instances a jump occurs back to a higher subtree, such as indicated by lines 237 and 238. In some instances, a match occurs when the feature word is any one of a plurality of predetermined words. For example, referring to block 239, a match occurs when the feature word is either "FGG" or "GFF." (F indicates a stroke or bar.) The "Z" notation indicates blanking. It will be obvious to one skilled in the art that the subtree of FIG. 15 may be implemented into a digital computer program or into hardware logic circuits.

The specific program employed in the 8080 computer for the basic logic tree used in the presently preferred embodiment is shown in standard 8080 language in Table II.

If a relatively inexpensive microprocessor, such as the 8080, is employed for the logic tree analysis, its speed in ordinary use is not fast enough to keep pace with a hand-held wand. To provide enhanced performance from such a commercially available microprocessor, a special tree access apparatus and method was developed.

In FIG. 16, a microprocessor is shown within the dotted line 242 which includes a CPU 245, a random-access memory 244, a memory access chip 246 and a timing chip 247. The RAM, CPU and memory access chip are coupled to the bidirectional data bus 248.

In normal computer operation, the program stored in the program memory 249, is addressed by a program counter or similar means which is included within the computer. However, in the described system, the computer itself does not directly address the memory 249, but rather memory addressing occurs through registers 252, 253 and 254. Each of these registers may be loaded with an address from either the computer or the program memory itself. Also, register 253 increments after it is read.

The A register 252 along with the B register 253 provides a 13-bit address for the memory 249 when selected by the multiplexer 251. The C register 254 supplies the 6 least significant bits of an address with the most significant bits being either 0000001 or 0000000 when selected by the multiplexer 251. Multiplexer 251 is controlled by the computer as indicated by the line 256. The loading of addresses into the A, B and C registers is also controlled by the computer as indicated by line 257. Thus the memory 249, which in the presently preferred embodiment provides 8K bytes of storage, may be accessed by (1) A and B registers, (2) C register, with the most significant bits equal to 000001, or (3) C register, with the most significant bits equal to 000000.

With the system of FIG. 16, only those addresses which need to be changed are processed by the computer. Most of the addresses are generated within the loop consisting of the memory 249, the portion of bus 248 leading to the A, B and C registers, and the register and multiplexer 251. Very highspeed scan rates of the memory are achieved by repeatedly accessing an address from the A and B registers. Each time an address is removed from the B register, it increments. In this manner, the normal protocol associated with incrementing an address through the computer is eliminated. This addressing scheme is particularly useful when the CPU is searching for a match. Each of the stored words leading from a node such as node 235 of FIG. 15, is sequentially accessed for a comparison by the computer with a feature word without the need of incrementing and address by the computer. Generally, the computer is not required for controlling the selection of an address until a match occurs. Also, memory pair look-ups require the loading of only a single address into the C register with the toggling of the two possible most significant bit patterns by the computer. It has been found that with the use of the registers shown in FIG. 16, an improvement by a factor of 4 to 5 in the recognition processing is achieved.

Thus an apparatus and method has been disclosed for the recognition of characters such as ordinary alphanumeric characters. The raw video data which results from a plurality of vertical scans is immediately processed without intermediate storage. Predetermined features are extracted from this video data in a serial manner and these features are encoded into digital words. Each of these new digital words is used to direct the analysis in a logic tree. In the presently preferred embodiment, this logic tree is implemented in a digital computer which employs extra registers to enhance computer processing.

TABLE II

```
                TITLE  'RC0G0017 870-0017-00 USE WITH EDIT0017'
0A00            PBASE    EQU    00A00H
1800            HAR      EQU    01800H
1C00            RBASE    EQU    01C00H
        1       FETCH    MACRO  ADR
        1                LXI    H,RBASE+ADR
                         ENDM
0000                     ORG    0

0001            FLAGS:   DS     1             ;FLAG BYTE
0002            TNODE:   DS     2             ;TREE ADDRESS
0001            MQEND:   DS     1             ;END POINTER MEMORY QUEUE
0001            MQPTR:   DS     1             ;MEMORY QUEUE CURRENT POINTER
0002            MV:      DS     2             ;LAST MASK/VALUE
0001            SWIDTH:  DS     1             ;WIDTH OF LAST CHARACTER
0002            TWIDTH:  DS     2             ;CHARACTER TOTAL WIDTH
0001            FWIDTH:  DS     1             ;FEATURE TOTAL WIDTH
0001            SAME:    DS     1             ;LASE FEATURE FROM 3000
0001            WIDTH:   DS     1             ;SUMMATION WIDTH COUNT
0002            SNODE:   DS     2             ;;SAVE NODE ADDRESS
0001            T8WIDTH: DS     1             ;1/8 OF TOTAL WIDTH
0010            MQSTART  EQU    $             ;START OF FEATURE STRING QUEUE
0038            MQMAX    EQU    MQSTART+40    ;END OF FEATURE QUEUE AREA

1805            WA       EQU    HAR+05H       ;WRITE TREE A REGISTER
1806            WB       EQU    HAR+06H       ;WRITE TREE B REGISTER
1801            FSTAT    EQU    HAR+01H       ;FIFO STATUS READ
0002            FRDY     EQU    002H          ;FIFO READY BIT
1804            RAB      EQU    HAR+04H       ;TREE READOUT ADDRESS

;        FLAG BYTE BIT DEFINITION
0080            SPACE    EQU    080H          ;SPACE DECTECT CONTROL BIT
0040            SLUF     EQU    040H          ;SLUF CONTROL BIT
0020            DETECT   EQU    020H          ;EXCESS IDLE DETECT
0010            CUP      EQU    010H          ;CONDITIONAL TEST UPDATE FLAG
0008            COND     EQU    008H          ;CONDITIONAL TEST FLAG
0001            DIR      EQU    001H          ;DIRECTION CONTROL BIT

;
                ;        MAIN RECOGNITION ENTRY
                ;        MEMORY AREA PARAMETER IN B,C
                ;
0A00                     ORG    PBASE
0A00    C3430A           JMP    RECB

;
                ;        OPERATION TABLES
                ;
                ;        OPCODES
                ;
                ; JS     0ETTTTTT AAAAAAAA
                ; JL     10EAAAAA MMMMMMMM UUUUUUUU AAAAAAAA
                ; JWS    1100WWWW AAAAAAAA
                ; JWL    1101WWWW XXXAAAAA AAAAAAAA
                ; JM     1110EAAA AATTTTTT AAAAAAAA
                ; RS     11110ETT CCCCCCCC
                ; RL     11111 00E MMMMMMMM UUUUUUUU CCCCCCCC
                ; JRS    11111010 AAAAAAAA
                ; JRL    11111011 XXXAAAAA AAAAAAAA
                ; RST    11111100 XXXAAAAA AAAAAAAA
                ; EOS    11111101 EXXAAAAA AAAAAAAA
```

```
0A73   37                        STC                         ;RETURN ERROR
0A74   C9                        RET
0A75              CTL0:
                        ;       CONTROL SECTION-RESET FLAGS AND WIDTHS
       1          +             FETCH  M@END                 ;M@END = M@START
0A75 1 21031C     +             LXI    H,RBASE+M@END
0A78   3610                     MVI    M,M@START
0A7A   AF                       XRA    A                     ;SAME, FWIDTH = 0
0A7B   2E08                     MVI    L,SAME
0A7D   77                       MOV    M,A
0A7E   2E0A                     MVI    L,FWIDTH
0A80   77                       MOV    M,A
                        ;       TEST FOR DIRECTION
0A81   2E00                     MVI    L,FLAGS               ;ADDRESS FLAGS
0A83   79                       MOV    A,C                   ;RELOAD OP
0A84   E6FE                     ANI    0FEH
0A86   FEC2                     CPI    0C2H
0A88   C29F0A                   JNZ    CTL1                  ;NOT DIRECTION
0A8B   7E                       MOV    A,M                   ;RESET DIRECTION BIT
0A8C   E60.                     ANI    NOT DIR
0A8E   F620                     ORI    DETECT                ;SET IDLE DETECT SCAN
0A90   47                       MOV    B,A
0A91   79                       MOV    A,C                   ;TEST FOR REVERSE
0A92   E601                     ANI    DIR
0A94   80                       ORA    B
0A95   77                       MOV    M,A                   ;SAVE RESULT
0A96   2E08                     MVI    L,TWIDTH              ;RESET TOTAL WIDTH
0A98   AF                       XRA    A
0A99   77                       MOV    M,A
0A9A   23                       INX    H
0A9B   77                       MOV    M,A
0A9C   37                       STC                          ;RETURN WITH DATA
0A9D   79                       MOV    A,C
0A9E   C9                       RET
                        ;       TEST FOR RESET
0A9F              CTL1:
0A9F   79                       MOV    A,C
0AA0   FEC6                     CPI    0C6H
0AA2   C2B20A                   JNZ    CTL2                  ;NOT RESET
0AA5   7E                       MOV    A,M                   ;SPACE = 0
0AA6   E6&/                     ANI    NOT (SPACE OR DETECT)
0AA8   77                       MOV    M,A
0AA9   AF                       XRA    A
0AAA   2E07                     MVI    L,SWIDTH              ;SWIDTH, TWIDTH = 0
0AAC   77                       MOV    M,A
0AAD   23                       INX    H
0AAE   77                       MOV    M,A
0AAF   23                       INX    H
0AB0   77                       MOV    M,A
0AB1   C9                       RET                          ;NON DATA RETURN
                        ;       TEST FOR IDLE
0AB2              CTL2:
0AB2   FEC0                     CPI    0C0H
0AB4   C2020B                   JNZ    CTL3                  ;NOT IDLE
                        ;       TEST FOR EXCESS IDLE AFTER DIRECTION IF NECESSARY
0AB7   7E                       MOV    A,M                   ;LOAD FLAGS
0AB8   E620                     ANI    DETECT
0ABA   CACA0A                   JZ     CTL4                  ;BRANCH IF NOT WORKING ON THIS CASE
0ABD   2E09                     MVI    L,TWIDTH+1            ;SUM WIDTH
0ABF   7E                       MOV    A,M
0AC0   80                       ADD    B
0AC1   77                       MOV    M,A
0AC2   3E10                     MVI    A,16                  ;IDLE COUNT LIMIT
0AC4   96                       SUB    M
0AC5   D0                       RNC
0AC6   3EF3                     MVI    A,0F3H                ;EXCESS COUNT
0AC8   37                       STC
0AC9   C9                       RET
0ACA              CTL4:
                        ;       IF NOT SPACE OR EOF CHECKING - RETURN NO DATA
0ACA   7E                       MOV    A,M
0ACB   E680                     ANI    SPACE
0ACD   C8                       RZ
                        ;       SPACE/EOF CHECK - SUM TOTAL WIDTH
0ACE   2E09                     MVI    L,TWIDTH+1            ;ADD TOTAL WIDTH
0AD0   7E                       MOV    A,M
```

```
                ; JTW    11111110 WWWWWWWW XXXAAAAA AAAAAAAA
                ; CND    11111111
                ;
                ;        -----MUST BE ALIGNED SUCH THAT ENTIRE TABLE FALLS
                ;        INTO SAME 256 BYTE PAGE
                ;
0A03            OTAB1   EQU     $
0A03    D40C            DW      TS
0A05    D40C            DW      TS
0A07    D40C            DW      TS
0A09    D40C            DW      TS
0A0B    D40C            DW      TS
0A0D    D40C            DW      TS
0A0F    D40C            DW      TS
0A11    D40C            DW      TS
0A13    1E0D            DW      TL
0A15    1E0D            DW      TL
0A17    1E0D            DW      TL
0A19    1E0D            DW      TL
0A1B    9C0D            DW      TWS
0A1D    680D            DW      TWL
0A1F    F40C            DW      TM
0A21    C20C            DW      TPRO2           ;LONG OP
0A23            OTAB2   EQU     $
0A23    C90D            DW      RS
0A25    C90D            DW      RS
0A27    C90D            DW      RS
0A29    C90D            DW      RS
0A2B    C90D            DW      RS
0A2D    C90D            DW      RS
0A2F    C90D            DW      RS
0A31    C90D            DW      RS
0A33    EB0D            DW      RL
0A35    EB0D            DW      RL
0A37    490D            DW      TRS
0A39    580D            DW      TRL
0A3B    970E            DW      RSET
0A3D    390D            DW      EOS
0A3F    730D            DW      JTW
0A41    E10D            DW      CND
0A43            RECB:
                ;       CHECK FIFO FOR DATA
0A43    210118          LXI     H,FSTAT         ;ADDRESS STATUS
0A46    7E              MOV     A,M             ;READ AND TEST
0A47    E602            ANI     FRDY            ;STATUS
0A49    C0              RNZ                     ;RETURN ON NO DATA
                ;       FIFO HAS DATA-LOAD
0A4A    46              MOV     B,M             ;LOAD WIDTH
0A4B    78              MOV     A,B
0A4C    E601            ANI     001H
0A4E    CA5B0A          JZ      L1
0A51    7E              MOV     A,M
0A52    E601            ANI     001H
0A54    CA5B0A          JZ      L1
0A57    3EF0            MVI     A,0F0H
0A59    37              STC
0A5A    C9              RET
0A5B            L1:
0A5B    78              MOV     A,B             ;LOAD WIDTH
0A5C    2F              CMA                     ;WIDTH IS INVERTED
0A5D    1F              RAR                     ;AND MUST BE ALIGNED
0A5E    1F              RAR
0A5F    1F              RAR
0A60    1F              RAR
0A61    E60F            ANI     00FH
0A63    3C              INR     A
0A64    47              MOV     B,A
0A65    2B              DCX     H
0A66    7E              MOV     A,M             ;READ COMPLEMENTED DATA
0A67    2F              CMA
0A68    4F              MOV     C,A
                ;       DECIDE ON CONTROL OR FEATURE SECTION
0A69    FEC0            CPI     0C0H
0A6B    DA0D0B          JC      FTR             ;BRANCH ON FEATURE
0A6E    FEE0            CPI     0E0H
0A70    DA750A          JC      CTLO
```

```
0AD1   80                    ADD    B
0AD2   77                    MOV    M,A
0AD3   4F                    MOV    C,A
0AD4   2B                    DCX    H
0AD5   3E00                  MVI    A,0
0AD7   8E                    ADC    M
0AD8   77                    MOV    M,A
0AD9   47                    MOV    B,A
                      ;      SWIDTH*2
0ADA   2E07                  MVI    L,SWIDTH
0ADC   7E                    MOV    A,M
0ADD   B7                    ORA    A              ;IF SWIDTH=0 THEN IGNORE CHECK
0ADE   C8                    RZ
0ADF   17                    RAL
0AE0   6F                    MOV    L,A
0AE1   3E00                  MVI    A,0
0AE3   17                    RAL
0AE4   67                    MOV    H,A
                      ;      IF TWIDTH > SWIDTH*2 THEN EOF
0AE5   7D                    MOV    A,L
0AE6   91                    SUB    C
0AE7   7C                    MOV    A,H
0AE8   98                    SBB    B
0AE9   DAEE0A                JC     $+5
0AEC   B7                    ORA    A              ;NON-EOF, NO DATA RETURN
0AED   C9                    RET
                      ;      SPACE, SWIDTH, TWIDTH = 0
       1              +      FETCH FLAGS
0AEE 1 21001C         +      LXI    H,RBASE+FLAGS
0AF1   7E                    MOV    A,M
0AF2   E6{/                  ANI    NOT SPACE
0AF4   77                    MOV    M,A
0AF5   2E07                  MVI    L,SWIDTH
0AF7   AF                    XRA    A
0AF8   77                    MOV    M,A
0AF9   2E08                  MVI    L,TWIDTH
0AFB   77                    MOV    M,A
0AFC   23                    INX    H
0AFD   77                    MOV    M,A
0AFE   3ED1                  MVI    A,0D1H         ;SET EOF
0B00   37                    STC                   ;DATA RETURN
0B01   C9                    RET
                      ;      ALL OTHER CONTROLS - NON DATA RETURN
0B02          CTL3:
0B02   2E08                  MVI    L,TWIDTH       ;TOTAL WIDTH = 0
0B04   AF                    XRA    A
0B05   77                    MOV    M,A
0B06   23                    INX    H
0B07   77                    MOV    M,A
0B08   C9                    RET
0B09          FREJ:
0B09   3EEF   FERR:          MVI    A,0EFH
0B0B   37                    STC
0B0C   C9                    RET
                      ;      TREE PROCESS PAST END OF FEATURES
                      ;      FEATURE CODE-CHECK SLUF FLAG
0B0D          FTR:
       1              +      FETCH FLAGS           ;RESET DETECT BIT
0B0D 1 21001C         +      LXI    H,RBASE+FLAGS
0B10   7E                    MOV    A,M
0B11   E6./                  ANI    NOT DETECT
0B13   77                    MOV    M,A
       1              +      FETCH FWIDTH          ;SUM FEATURE WIDTH+1
0B14 1 210A1C         +      LXI    H,RBASE+FWIDT
0B17   7E                    MOV    A,M
0B18   80                    ADD    B
0B19   77                    MOV    M,A
0B1A   DA090B                JC     FERR           ;BRANCH ON FEATURE>255
0B1D   23                    INX    H              ;CHECK ON DUPLICATE FEATURE
0B1E   7E                    MOV    A,M
0B1F   A9                    XRA    C
0B20   C8                    RZ                    ;RETURN ON SAME FEATURE
0B21   71                    MOV    M,C            ;SAVE NEW FEATURE
0B22   2E03                  MVI    L,MQEND        ;CHECK FOR FEATURE SPACE
0B24   3E38                  MVI    A,MQMAX
0B26   56                    MOV    D,M
```

```
0827   BA              CMP   D
0828   DA090B          JC    FERR
082B   34              INR   M            ;UPDATE END POINTER
082C   34              INR   M
082D   2E0A            MVI   L,FWIDTH
082F   7E              MOV   A,M
0830   3600            MVI   M,0          ;ZERO FEATURE WIDTH FOR NEW FEATURE
0832   6A              MOV   L,D
0833   77              MOV   M,A          ;SAVE WIDTH
0834   23              INX   H
0835   71              MOV   M,C          ;AND FEATURE
0836   5F              MOV   E,A
              ;       CHECK FOR SPACE DETECTION
0837   2E00            MVI   L,FLAGS
0839   7E              MOV   A,M
083A   E680            ANI   SPACE
083C   CA650B          JZ    FTR2
083F   7E              MOV   A,M
0840   E67F            ANI   NOT SPACE    ;NOW THAT IN CHAR - RESET SPACE
0842   77              MOV   M,A
              ;       ACCUMULATE TOTAL WIDTH FOR SPACE
0843   2E09            MVI   L,TWIDTH+1
0845   7E              MOV   A,M
0846   3600            MVI   M,0
0848   80              ADD   B
0849   4F              MOV   C,A
084A   2B              DCX   H
084B   7E              MOV   A,M
084C   3600            MVI   M,0
084E   CE00            ACI   0
0850   47              MOV   B,A
              ;       IF TWIDTH > SWIDTH THEN RETURN SPACE
0851   2E07            MVI   L,SWIDTH
0853   7E              MOV   A,M
0854   B7              ORA   A
0855   CA5F0B          JZ    FTR3         ;SKIP TEST IF SWIDTH = 0
0858   91              SUB   C
0859   3E00            MVI   A,0
085B   98              SBB   B
085C   DA610B          JC    $+5
085F   B7      FTR3:   ORA   A
0860   C9              RET                ;NON SPACE - RETURN NO DATA
0861   3ED0            MVI   A,0D0H       ;RETURN SPACE
0863   37              STC
0864   C9              RET
0865   43      FTR2:   MOV   B,E          ;DO NOT ADD INTO TOTAL IF FIRST FEATU
0866   3E10            MVI   A,M@START
0868   BA              CMP   D
0869   CA7D0B          JZ    FTR1
086C   78              MOV   A,B
086D   2E09            MVI   L,TWIDTH+1   ;SUM TOTAL WIDTH
086F   86              ADD   M
0870   77              MOV   M,A
0871   DA090B          JC    FERR         ;BRANCH ON TOTAL WIDTH>255
              ;       SAVE 1/16 TOTAL WIDTH
0874   1F              RAR
0875   1F              RAR
0876   1F              RAR
0877   1F              RAR
0878   E60F            ANI   0FH
087A   2E0F            MVI   L,TBWIDTH
087C   77              MOV   M,A
087D           FTR1:
087D   79              MOV   A,C          ;IF VVX-PROCESS TREE
087E   E63C            ANI   03CH
0880   C0              RNZ                ;RETURN NON VVX
              ;       READY TO PROCESS TREE - SET FETCH ADDRESS
              ;
        1  +          FETCH FLAGS         ;RESET CONDITIONAL BITS
0881  1 21001C +       LXI   H,RBASE+FLAGS
0884   7E              MOV   A,M
0885   E6/'            ANI   NOT (COND OR CUP)
0887   77              MOV   M,A
0888   210518          LXI   H,WA         ;GET TREE START ADDRESS
088B   36FF            MVI   M,0FFH       ;ZERO A
088D   23              INX   H
```

```
0B8E   36B0              MVI   M,0B0H         ;ADDRESS B0 IN B
0B90   2B                DCX   H
0B91   2B                DCX   H
0B92   46                MOV   B,M            ;READ START ADDRESS
0B93   4E                MOV   C,M
0B94   23                INX   H              ;STORE START ADDRESS TO AB
0B95   78                MOV   A,B
0B96   2F                CMA
0B97   77                MOV   M,A
0B98   23                INX   H
0B99   71                MOV   M,C
       1            +    FETCH TNODE          ;STORE ADDRESS IN NODE POINTER
0B9A 1 21011C       +    LXI   H,RBASE+TNODE
0B9D   70                MOV   M,B
0B9E   23                INX   H
0B9F   71                MOV   M,C
0BA0   2E04              MVI   L,MQPTR        ;INIT QUEUE SCAN POINTER
0BA2   3610              MVI   M,MQSTART
                         ;
                         ;   CHECK FOR UPPER AS LAST FEATURE BEFORE VVX
                         ;
0BA4   2B                DCX   H
0BA5   7E                MOV   A,M            ;LOAD MQEND
0BA6   D603              SUI   3              ;TO LAST REAL FEATURE
0BA8   6F                MOV   L,A
0BA9   7E                MOV   A,M            ;LOAD FEATURE
0BAA   B7                ORA   A
0BAB   FAB20B            JM    $+7            ;BRANCH ON UPPER
0BAE   3EF2              MVI   A,0F2H         ;ERROR CODE
0BB0   37                STC
0BB1   C9                RET
0BB2   2E05              MVI   L,MV           ;INIT MV SET
0BB4   3600              MVI   M,0
0BB6   23                INX   H
0BB7   36FF              MVI   M,0FFH
                         ;   INIT WIDTH COUNT
0BB9   2E0C              MVI   L,WIDTH
0BBB   3600              MVI   M,0
                         ;   SCAN STRING LOOKING FOR TRANSITIONAL FEATURES BETWEEN
                         ;   IDENTICAL FEATURES
       1            +    FETCH MQEND
0BBD 1 21031C       +    LXI   H,RBASE+MQEND
0BC0   7E                MOV   A,M
0BC1   D610              SUI   MQSTART
0BC3   FE07              CPI   7
0BC5   DA170C            JC    FTR5           ;SCAN STRINGS WHICH HAVE ENOUGH FTRS
0BC8   21111C            LXI   H,RBASE+MQSTART+1
0BCB   4E                MOV   C,M
0BCC   23                INX   H
0BCD   46                MOV   B,M
0BCE   23                INX   H
0BCF             FTR4:
0BCF   50                MOV   D,B            ;SAVE OLD FEATURE
0BD0   59                MOV   E,C
0BD1   4E                MOV   C,M            ;LOAD NEW FEATURE
0BD2   23                INX   H
0BD3   46                MOV   B,M
0BD4   23                INX   H
0BD5   79                MOV   A,C            ;TEST FOR NEW AS VVX
0BD6   E63C              ANI   03CH
0BD8   CA170C            JZ    FTR5
                         ;   ELEMINATE LFFF TO FFF FEATURES
0BDB   7B                MOV   A,E            ;LOAD OLD FEATURE
0BDC   A9                XRA   C              ;TEST AGAINST NEW FEATURE
0BDD   E63F              ANI   03FH
0BDF   C2F40B            JNZ   FTR9           ;BRANCH IF NOT SAME FEATURE
0BE2   79                MOV   A,C            ;IS NEW FEATURE NORMAL SENSE
0BE3   E6C0              ANI   0C0H
0BE5   C2F40B            JNZ   FTR9
0BE8   7B                MOV   A,E            ;LAST FEATURE MUST NOT BE NORMAL
0BE9   E6C0              ANI   0C0H
0BEB   CAF40B            JZ    FTR9
0BEE   4B                MOV   C,E            ;MAKE THIS FEATURE SAME AS LAST
0BEF   2B                DCX   H
0BF0   2B                DCX   H
0BF1   71                MOV   M,C            ;SAVE IN QUEUE
```

```
0BF2   23                       INX   H
0BF3   23                       INX   H
0BF4              FTR9:
0BF4   3A0F1C                   LDA   RBASE+TBWIDTH   ;TEST FOR TRANSITIONAL WIDTH
0BF7   90                       SUB   B
0BF8   DACF0B                   JC    FTR4
0BFB   79                       MOV   A,C
0BFC   E63F                     ANI   03FH
0BFE   FE34                     CPI   034H            ;DO NOT REMOVE BBB
0C00   CACF0B                   JZ    FTR4
0C03   7B                       MOV   A,E
0C04   BE                       CMP   M               ;TEST FOR SAME FEATURE BOTH SIDES
0C05   C2CF0B                   JNZ   FTR4
0C08   A9                       XRA   C               ;TEST FOR SAME SENSE
0C09   E6C0                     ANI   0C0H
0C0B   C2CF0B                   JNZ   FTR4
0C0E   4B                       MOV   C,E             ;ALL OK - DECLARE SAME FEATURE
0C0F   2B                       DCX   H
0C10   2B                       DCX   H
0C11   71                       MOV   M,C             ;AND SAVE
0C12   23                       INX   H
0C13   23                       INX   H
0C14   C3CF0B                   JMP   FTR4
0C17              FTR5:
                  ;             NOW RESCAN STRING SQUEEZING OUT SAME FEATURES
0C17   21111C                   LXI   H,RBASE+MQSTART+1
0C1A   54                       MOV   D,H
0C1B   5D                       MOV   E,L
0C1C              FTR51:
0C1C   4E                       MOV   C,M             ;LOAD FIRST FEATURE
0C1D   23                       INX   H
0C1E   46                       MOV   B,M
0C1F   23                       INX   H
0C20              FTR6:
0C20   79                       MOV   A,C             ;TEST NEW FEATURE FOR VVX
0C21   E63C                     ANI   03CH
0C23   CA440C                   JZ    FTR8            ;BRANCH IF IT IS
0C26   79                       MOV   A,C
0C27   BE                       CMP   M               ;IS NEXT FEATURE SAME
0C28   C2380C                   JNZ   FTR7            ;NO
0C2B   23                       INX   H
0C2C   78                       MOV   A,B
0C2D   86                       ADD   M               ;SUM WIDTHS
0C2E   47                       MOV   B,A
0C2F   23                       INX   H
0C30   3A031C                   LDA   RBASE+MQEND     ;SHORTEN STRING
0C33   3D                       DCR   A
0C34   3D                       DCR   A
0C35   32031C                   STA   RBASE+MQEND
0C38   C3200C                   JMP   FTR6
0C3B              FTR7:
0C3B   EB                       XCHG                  ;NOT SAME - SAVE OLD
0C3C   71                       MOV   M,C
0C3D   23                       INX   H
0C3E   70                       MOV   M,B
0C3F   23                       INX   H
0C40   EB                       XCHG
0C41   C31C0C                   JMP   FTR51
0C44              FTR8:
0C44   EB                       XCHG                  ;SAVE NEW VVX
0C45   71                       MOV   M,C
0C46   23                       INX   H
0C47   70                       MOV   M,B
                  ;             QUEUE IS IN MEMORY - GET DATA
0C48 1            +R0:          FETCH MQEND
0C48 1 21031C     +             LXI   H,RBASE+MQEND
0C4B   7E                       MOV   A,M             ;CHECK FOR MQPTR > MQEND
0C4C   23                       INX   H
0C4D   96                       SUB   M
0C4E   DA090B                   JC    FREJ
0C51   7E                       MOV   A,M             ;LOAD POINTER
0C52   34                       INR   M               ;UPDATE FOR NEXT PASS
0C53   34                       INR   M
0C54   6F                       MOV   L,A
0C55   46                       MOV   B,M             ;LOAD WIDTH
0C56   23                       INX   H
```

```
 0C57   4E                  MOV    C,M              ;AND FEATURE
                      ;     TEST FEATURE FOR MASK/VALUE LOOP
 0C58   2E05                MVI    L,MV
 0C5A   7E                  MOV    A,M              ;DO NOT SLUF ON XXX
 0C5B   23                  INX    H
 0C5C   B6                  ORA    M
 0C5D   CA700C              JZ     R5
 0C60   2B                  DCX    H
 0C61   79                  MOV    A,C
 0C62   A6                  ANA    M                ;AND IN OLD MASK
 0C63   23                  INX    H
 0C64   AE                  XRA    M                ;NOW TEST VALUE
 0C65   C2700C              JNZ    R5               ;BRANCH IF NEW FEATURE
 0C68   2E0C                MVI    L,WIDTH          ;UPDATE SUMMED WIDTH
 0C6A   7E                  MOV    A,M
 0C6B   80                  ADD    B
 0C6C   77                  MOV    M,A
 0C6D   C3480C              JMP    R0
 0C70 1              +R5:   FETCH WIDTH             ;ADD WIDTH AND SET FOR TREE PASS
 0C70 1 210C1C       +      LXI    H,RBASE+WIDTH
 0C73   7E                  MOV    A,M
 0C74   80                  ADD    B
 0C75   47                  MOV    B,A
 0C76   3600                MVI    M,0              ;ZERO WIDTH FOR NEW FEATURE
 0C78   2E05                MVI    L,MV             ;CLEAR MASK/VALUE TO NO PASS
 0C7A   3600                MVI    M,0
 0C7C   23                  INX    H
 0C7D   36FF                MVI    M,0FFH
                      ;     NEW FEATURE ADDESSED - TEST FOR CONDITIONAL UPDATE
 0C7F   2E00                MVI    L,FLAGS          ;TEST BIT
 0C81   7E                  MOV    A,M
 0C82   E610                ANI    CUP
 0C84   CA9D0C              JZ     R6               ;BRANCH ON NO UPDATE
 0C87   2E0F                MVI    L,T8WIDTH        ;LOAD TOTAL WIDTH/8
 0C89   7E                  MOV    A,M
 0C8A   90                  SUB    B                ;SUBTRACT WIDTH
 0C8B   DA9D0C              JC     R6               ;BRANCH ON WIDTH > TWIDTH/8
                      ;     MUST UPDATE ADDRESS
 0C8E   2A0D1C              LHLD   RBASE+SNODE      ;LOAD OLD ADDRESS
 0C91   22011C              SHLD   RBASE+TNODE      ;SAVE IN TREE ADDRESS
 0C94   EB                  XCHG
 0C95   210518              LXI    H,WA             ;SEND TO TREE REGISTERS
 0C98   7B                  MOV    A,E
 0C99   2F                  CMA
 0C9A   77                  MOV    M,A              ;A IS INVERTED
 0C9B   23                  INX    H
 0C9C   72                  MOV    M,D
                      ;     COMPLETE - CONTINUE
 0C9D                R6:
 0C9D   CDA30C              CALL   TPR0             ;PROCESS FEATURE THRU TREE
 0CA0   C3480C              JMP    R0               ;RETURN - GET NEW FEATURE
                      ;
                      ;     TREE PROCESS
                      ;     WIDTH/FEATURE IN B,C
                      ;     TREE READ ADDRESS IN H,L
                      ;
 0CA3                TPR0:
                   1 +      FETCH FLAGS
 0CA3 1 21001C       +      LXI    H,RBASE+FLAGS
 0CA6   7E                  MOV    A,M
 0CA7   E6/'                ANI    NOT (COND OR CUP)
 0CA9   77                  MOV    M,A
 0CAA                TPR01:
 0CAA   210418              LXI    H,RAB            ;LOAD TREE READ ADDRESS
 0CAD   56                  MOV    D,M              ;READ OP
 0CAE   7A                  MOV    A,D              ;LOAD OP
 0CAF   0F                  RRC                     ;ALIGN FOR TABLE LOOKUP
 0CB0   0F                  RRC
 0CB1   0F                  RRC
 0CB2   E61E                ANI    01EH             ;STRIP UNUSED BITS
 0CB4   C603                ADI    OTAB1 AND 0FFH   ;COMPUTE TABLE 1 ADDRESS
 0CB6   6F                  MOV    L,A
 0CB7   260A                MVI    H,OTAB1 SHR 8
 0CB9   7E                  MOV    A,M              ;LOAD ROUTINE ADDRESS
 0CBA   23                  INX    H
 0CBB   66                  MOV    H,M
```

```
0CBC    6F                      MOV    L,A
                        ;       PLACE ROUTINE ADDRESS ON STACK AND SIMUTANEOUSLY PULL
                        ;       TREE ADDRESS BACK TO H,L
                        ;       WHEN RETURN IS EXECUTED IT WILL BRANCH TO PROPER
                        ;       ROUTINE EXECUTION
0CBD    E5                      PUSH   H
0CBE    210418                  LXI    H,RAB
0CC1    C9                      RET
                        ;
                        ;       IF THIS IS A LONG OP WE GET HERE
                        ;
0CC2            TPR02:                                  ;REPEAT ABOVE WITH DIFFERENT TABLE
0CC2    7A                      MOV    A,D
0CC3    07                      RLC
0CC4    E61E                    ANI    01EH
0CC6    C623                    ADI    0TAB2 AND 0FFH
0CC8    6F                      MOV    L,A
0CC9    260A                    MVI    H,0TAB2 SHR 8
0CCB    7E                      MOV    A,M
0CCC    23                      INX    H
0CCD    66                      MOV    H,M
0CCE    6F                      MOV    L,A
0CCF    E5                      PUSH   H
0CD0    210418                  LXI    H,RAB
0CD3    C9                      RET
                        ;
                        ;       JUMP SHORT OP
                        ;
0CD4    72      TS:             MOV    M,D             ;SET MASK/VALUE TABLE ADDRESS
0CD5    C5                      PUSH   B               ;SAVE WIDTH/FEATURE DURING MV SAVE
0CD6    79                      MOV    A,C             ;LOAD FEATURE
0CD7    23                      INX    H               ;ADDRESS MASK READOUT
0CD8    46                      MOV    B,M             ;LOAD MASK
0CD9    A0                      ANA    B               ;FEATURE AND MASK
0CDA    23                      INX    H               ;ADDRESS VALUE READOUT
0CDB    4E                      MOV    C,M             ;SAVE VALUE
0CDC    A9                      XRA    C               ;RESULT EXOR VALUE
0CDD    2B                      DCX    H               ;ADDRESS TREE READOUT
0CDE    2B                      DCX    H
0CDF    CAED0C                  JZ     TSP             ;SAVE MV VALUE
                        ;       FAIL - CHECK END OF NODE FLAG FOR AUTO REJECT
0CE2    C1                      POP    B               ;STRIP W/F OFF STACK
0CE3    7A                      MOV    A,D             ;LOAD OP CODE
0CE4    E640                    ANI    040H            ;TEST EON FLAG
0CE6    C28A0E                  JNZ    REJ             ;REJECT IF SET
0CE9    7E                      MOV    A,M             ;DUMMY READ TO PASS RELATIVE OFFEST
0CEA    C3A30C                  JMP    TPR0            ;RETRY SAME FEATURE
0CED            TSP:
0CED    CD160E                  CALL   CTEST           ;TEST FOR CONDITIONAL PASS
0CF0    C1                      POP    B
0CF1    C3AB0D                  JMP    RELAD
                        ;
                        ;       JUMP MEDIUM OP
                        ;
0CF4    7E      TM:             MOV    A,M             ;READ TABLE ADDRESS
0CF5    5F                      MOV    E,A             ;SAVE ADDRESS FOR LATER USE
0CF6    77                      MOV    M,A             ;STORE TABLE ADDRESS
0CF7    C5                      PUSH   B               ;AGAIN WITH MV SAVE
0CF8    23                      INX    H               ;SET TO READ MASK
0CF9    79                      MOV    A,C             ;LOAD FEATURE
0CFA    46                      MOV    B,M             ;LOAD MASK
0CFB    A0                      ANA    B               ;FEATURE AND MASK
0CFC    23                      INX    H
0CFD    4E                      MOV    C,M             ;LOAD VALUE
0CFE    A9                      XRA    C               ;RESULT EXOR VALUE
0CFF    2B                      DCX    H               ;BACK TO TREE READ
0D00    2B                      DCX    H
0D01    CA0F0D                  JZ     TMP             ;BRANCH ON PASS
0D04    C1                      POP    B               ;RELOAD W/F
0D05    7E                      MOV    A,M             ;AND SKIP RESET OF ADDRESS
0D06    7A                      MOV    A,D             ;LOAD OP TO CHECK FOR EON
0D07    E608                    ANI    008H
0D09    C28A0E                  JNZ    REJ             ;BRANCH ON END OF NODE
0D0C    C3A30C                  JMP    TPR0            ;RETRY SAME FEATURE
0D0F            TMP:
0D0F    CD160E                  CALL   CTEST           ;TEST FOR CONDITIONAL PASS
```

```
0D12    C1                  POP     B
0D13    7B                  MOV     A,E         ;RELOAD ADDRESS BITS
0D14    AA                  XRA     D           ;MERGE WITH THOSE FROM OP FIELD
0D15    E6C0                ANI     11000000B
0D17    AA                  XRA     D
0D18    07                  RLC                 ;ALIGN
0D19    07                  RLC
0D1A    57                  MOV     D,A         ;SET FOR ABSOLUTE BRANCH
0D1B    C3890D              JMP     ABSAD
                        ;
                        ;       JUMP LONG OP
                        ;
0D1E    79        TL:       MOV     A,C         ;LOAD FEATURE
0D1F    C5                  PUSH    B
0D20    46                  MOV     B,M         ;LOAD MASK
0D21    A0                  ANA     B           ;FEATURE AND MASK
0D22    4E                  MOV     C,M         ;NOW VALUE
0D23    A9                  XRA     C           ;RESULT EXOR VALUE
0D24    CA320D              JZ      TLP         ;BRANCH ON PASS
                        ;       FAIL - CHECK FOR AUTO REJECT
0D27    C1                  POP     B           ;RELOAD W/F
0D28    7A                  MOV     A,D         ;LOAD OP
0D29    E620                ANI     020H        ;TEST EON
0D2B    C28A0E              JNZ     REJ         ;REJECT AT END OF NODE
0D2E    7E                  MOV     A,M         ;DUMMY READ
0D2F    C3A30C              JMP     TPR0        ;CONTINUE - SAME FEATURE
0D32              TLP:
0D32    CD160E              CALL    CTEST       ;TEST FOR CONDITIONAL PASS
0D35    C1                  POP     B
0D36    C3890D              JMP     ABSAD
                        ;
                        ;       BRANCH IF VVX
                        ;
0D39    79        EOS:      MOV     A,C         ;LOAD FEATURE
0D3A    E63C                ANI     03CH        ;TEST FOR VVX
0D3C    CA830D              JZ      EOSP        ;BRANCH ON PASS
0D3F    7E                  MOV     A,M         ;TEST EON
0D40    E680                ANI     080H
0D42    C28A0E              JNZ     REJ         ;AUTO REJECT
0D45    7E                  MOV     A,M         ;SLUF NEXT BYTE
0D46    C3A30C              JMP     TPR0
                        ;
                        ;       JUMP REVERSE SHORT OP
                        ;
0D49    E5        TRS:      PUSH    H           ;SAVE TREE READOUT ADDRESS
        1       +         FETCH   FLAGS       ;ADDRESS FLAG BYTE
0D4A 1  21001C  +         LXI     H,RBASE+FLAGS
0D4D    7E                  MOV     A,M
0D4E    E601                ANI     DIR         ;TEST DIRECTION
0D50    C2A70D              JNZ     TRSP        ;BRANCH ON REVERSE
0D53    E1                  POP     H           ;RELOAD TREE ADDRESS POINTER
0D54    7E                  MOV     A,M         ;DUMMY READ RELEATIVE ADDRESS
0D55    C3A30C              JMP     TPR0        ;CONTINUE SAVE FEATURE
                        ;
                        ;       JUMP REVERSE LONG OP
                        ;
0D58    E5        TRL:      PUSH    H
        1       +         FETCH   FLAGS
0D59 1  21001C  +         LXI     H,RBASE+FLAGS
0D5C    7E                  MOV     A,M
0D5D    E601                ANI     DIR         ;TEST DIRECTION BIT
0D5F    E1                  POP     H           ;RESTORE TREE POINTER
0D60    C2830D              JNZ     TRLP        ;BRANCH ON REVERSE
0D63    7E                  MOV     A,M         ;DUMMY READ ADDRESS
0D64    7E                  MOV     A,M
0D65    C3A30C              JMP     TPR0        ;RETRY SAME FEATURE
                        ;
                        ;       JUMP WIDTH LONG
                        ;
0D68    CD2D0E    TWL:      CALL    WTEST
0D6B    D2830D              JNC     TWLP        ;BRANCH ON PASS
0D6E    7E                  MOV     A,M         ;DUMMY READ ADDRESS
0D6F    7E                  MOV     A,M
0D70    C3A30C              JMP     TPR0        ;RETRY SAME FEATURE
                        ;
                        ;       JUMP TOTAL WIDTH
```

```
                    ;
0D73   56      JTW:    MOV   D,M          ;LOAD WIDTH TEST VALUE
0D74   E5              PUSH  H            ;LOAD TOTAL WIDTH
     1         +       FETCH TWIDTH+1
0D75 1 21091C  +       LXI   H,RBASE+00009H
0D78   7E              MOV   A,M          ;LOAD TOTAL WIDTH
0D79   92              SUB   D            ;TEST
0D7A   E1              POP   H
0D7B   D2830D          JNC   JTWP         ;BRANCH ON PASS
0D7E   7E              MOV   A,M          ;SLUF DATA
0D7F   7E              MOV   A,M
0D80   C3A30C          JMP   TPR0
0D83           JTWP:
                    ;
                    ;   NON ADVANCE PASS TO ABSOLUTE ADDRESS
                    ;
0D83           EOSP:
0D83           TWLP:
0D83           TRLP:
0D83   56              MOV   D,M          ;LOAD MS ADDRESS BYTE
0D84   E5              PUSH  H            ;SAVE TREE ADDRESS
0D85   21A30C          LXI   H,TPR0       ;SET RETRY ADDRESS
0D88   E3              XTHL               ;AND SWAP WITH STACK
                    ;
                    ;   ABSOLUTE ADDRESS BRANCH
                    ;   NEW ADDRESS MS IN D
                    ;   HL ADDRESS TREE READOUT OF LS ADDRESS
                    ;   EXECUTION RESUMES WITH NEXT ADDRESS ON STACK
                    ;
0D89           ABSAD:
0D89   21041C          LXI   H,RAB        ;ADDRESS TREE READOUT
0D8C   5E              MOV   E,M          ;LOAD LS PORTION OF ADDRESS
     1         +       FETCH TNODE        ;SAVE ADDRESS IN MEMORY
0D8D 1 21011C  +       LXI   H,RBASE+TNODE
0D90   7A              MOV   A,D
0D91   77              MOV   M,A
0D92   23              INX   H
0D93   73              MOV   M,E
0D94   21061C          LXI   H,WB         ;SAVE IN TREE
0D97   73              MOV   M,E
0D98   2B              DCX   H
0D99   2F              CMA
0D9A   77              MOV   M,A          ;A REG USES INVERTED DATA
0D9B   C9              RET
                    ;
                    ;   JUMP WIDTH SHORT
                    ;
0D9C   CD2D0E  TWS:    CALL  WTEST
0D9F   D2A60D          JNC   TWSP         ;BRANCH ON PASS
0DA2   7E              MOV   A,M          ;FAIL - SKIP RELATIVE ADDRESS
0DA3   C3A30C          JMP   TPR0         ;RETRY - SAME FEATURE
                    ;   WIDTH OR REVERSE PASS
                    ;   COMPUTE NEW ADDRESS BUT RETAIN FEATURE
0DA6   E5      TWSP:   PUSH  H            ;SAVE TREE ADDRESS
0DA7   21A30C  TRSP:   LXI   H,TPR0       ;LOAD TREE PROCESS ADDRESS
0DAA   E3              XTHL               ;TO STACK
                    ;
                    ;   COMPUTE ADDRESS OF NEXT NODE USING RELATIVE OFFSET
                    ;   NEW NODE ADDRESS PLACED IN MEMORY AND TREE REGISTER
                    ;   REGISTER HL MUST ADDRESS TREE READOUT ON ENTRY
                    ;   UPON COMPLETION NEW ADDRESS IS NEXT VALUE ON STACK
                    ;
0DAB           RELAD:
0DAB   21041C          LXI   H,RAB        ;ADDRESS TREE READOUT
0DAE   56              MOV   D,M          ;LOAD OFFSET
     1         +       FETCH TNODE+1      ;ADD TO TREE ADDRESS
0DAF 1 21021C  +       LXI   H,RBASE+00002H
0DB2   7E              MOV   A,M
0DB3   82              ADD   D
0DB4   77              MOV   M,A          ;AND RESTORE
0DB5   57              MOV   D,A
0DB6   D2C40D          JNC   RELS         ;BRANCH IF MS NEEDS NO UPDATE
0DB9   2B              DCX   H            ;ADDRESS MS PORTION
0DBA   34              INR   M            ;UPDATE
0DBB   7E              MOV   A,M          ;LOAD FOR TREE
0DBC   21051C          LXI   H,WA         ;ADDRESS A REG
```

```
0DBF   2F              CMA
0DC0   77              MOV    M,A          ;A USES INVERTED DATA
0DC1   23              INX    H            ;FINISH WITH LS
0DC2   72              MOV    M,D
0DC3   C9              RET
0DC4         RELS:
0DC4   210618          LXI    H,WB         ;POINT TO B REG
0DC7   72              MOV    M,D
0DC8   C9              RET
                ;
                ;     REPORT SHORT OP
                ;
0DC9   7A    RS:       MOV    A,D          ;SET TABLE LOOKUP
0DCA   F6FC            ORI    0FCH
0DCC   77              MOV    M,A
0DCD   23              INX    H
0DCE   79              MOV    A,C          ;LOAD FEATURE
0DCF   A6              ANA    M            ;FEATURE AND MASK
0DD0   23              INX    H
0DD1   AE              XRA    M            ;RESULT EXOR VALUE
0DD2   2B              DCX    H            ;BACK TO TREE READOUT
0DD3   2B              DCX    H
0DD4   CAFB0D          JZ     RSP          ;BRANCH ON PASS
0DD7   7A              MOV    A,D          ;FAIL - TEST FOR END OF NODE
0DD8   E604            ANI    004H
0DDA   C2BA0E          JNZ    REJ          ;REJECT AT END OF NODE
0DDD   7E              MOV    A,M          ;DUMMY READ OF RELATIVE OFFSET
0DDE   C3A30C          JMP    TPR0         ;RETRY - SAME FEATURE
                ;     SET COND FLAG
0DE1         CND:
       1         +    FETCH FLAGS
0DE1 1 21001C    +    LXI    H,RBASE+FLAGS
0DE4   7E              MOV    A,M
0DE5   F608            ORI    COND
0DE7   77              MOV    M,A
0DE8   C3AA0C          JMP    TPR01
                ;
                ;     REPORT LONG OP
                ;
0DEB   79    RL:       MOV    A,C          ;LOAD FEATURE
0DEC   A6              ANA    M            ;FEATURE AND MASK
0DED   AE              XRA    M            ;RESULT EXOR VALUE
0DEE   CAFB0D          JZ     RSP          ;BRANCH ON PASS
0DF1   7A              MOV    A,D          ;FAIL - CHECK FOR EON
0DF2   E601            ANI    001H
0DF4   C2BA0E          JNZ    REJ          ;REJECT ON END OF NODE
0DF7   7E              MOV    A,M          ;DUMMY READ
0DF8   C3A30C          JMP    TPR0         ;RETRY SAME FEATURE
                ;
                ;     REPORT PASS - LOAD CHARACTER AND RETURN
                ;
0DFB   56    RSP:      MOV    D,M          ;LOAD CHARACTER
0DFC   AF              XRA    A            ;RESET TOTAL WIDTH
       1         +    FETCH TWIDTH
0DFD 1 21081C    +    LXI    H,RBASE+TWIDT
0E00   77              MOV    M,A
0E01   23              INX    H
0E02   4E              MOV    C,M          ;SAVE OLD WIDTH
0E03   77              MOV    M,A
0E04   2E00            MVI    L,FLAGS      ;SET SPACE CHECK
0E06   7E              MOV    A,M
0E07   F680            ORI    SPACE
0E09   77              MOV    M,A
0E0A   7A              MOV    A,D
0E0B   E680            ANI    080H         ;CHECK FOR NON WIDTH SAVE CHARACTER
0E0D   C2C00E          JNZ    TVVX
0E10   2E07            MVI    L,SWIDTH     ;SAVE WIDTH
0E12   71              MOV    M,C
0E13   C3BC0E          JMP    TVVX         ;TEST FOR SLUF REQ'D
                ;
                ;     CONDITIONAL PASS - SET CONDITIONAL PARMS
                ;
0E16         CTEST:
       1         +    FETCH MV
0E16 1 21051C    +    LXI    H,RBASE+MV
0E19   70              MOV    M,B
```

```
0E1A   23                    INX    H
0E1B   71                    MOV    M,C
0E1C   2E00                  MVI    L,FLAGS
0E1E   7E                    MOV    A,M
0E1F   E608                  ANI    COND
0E21   C8                    RZ                    ;RETURN ON NO UPDATE REQUEST
       ;             CONDITIONAL BIT SET - SET UPDATE BIT
0E22   7E                    MOV    A,M
0E23   F610                  ORI    CUP
0E25   77                    MOV    M,A
       ;             SAVE NODE ADDRESS
0E26   2A011C                LHLD   RBASE+TNODE
0E29   22D1C                 SHLD   RBASE+SNODE
0E2C   C9                    RET
       ;
       ;             WIDTH TEST - DIVIDE CURRENT FEATURE WIDTH BY
       ;             PROPORTIONAL VALUE OF TOTAL WIDTH
       ;
0E2D           WTEST:
0E2D   7A                    MOV    A,D           ;LOAD WIDTH TEST VALUE
0E2E   E60F                  ANI    00FH          ;STRIP OP BITS
0E30   57                    MOV    D,A           ;SAVE FOR LATER
0E31   C5                    PUSH   B             ;SPACE FOR WORK AREA
0E32   D5                    PUSH   D
     1                +      FETCH  TWIDTH+1      ;LOAD TOTAL WIDTH
0E33 1 21091C         +      LXI    H,RBASE+00009H
0E36   56                    MOV    D,M
0E37   78                    MOV    A,B           ;LOAD WI
0E38   0605                  MVI    B,5           ;SET SHIFT COUNT
0E3A   CD790E                CALL   SETND         ;SET NUMERATOR AND DENOMINATOR
0E3D   1F                    RAR                  ;RE-ALIGN WI
0E3E   4F                    MOV    C,A           ;AND SAVE
0E3F   7A                    MOV    A,D           ;LOAD WT
0E40   17                    RAL                  ;PREP FOR ZERO SHIFT
0E41   1F                    RAR                  ;SHIFT WT RIGHT ONE
0E42   B7                    ORA    A             ;CLEAR CARRY FOR NEXT PASS
0E43   05                    DCR    B             ;COUNT NUMBER OF SHIFTS
0E44   C2410E                JNZ    $-3           ;LOOP FOR ALL SHIFTS

0E47   57                    MOV    D,A           ;CHECK FOR 0 DIVIDE
0E48   B7                    ORA    A
0E49   CA870E                JZ     WERR
0E4C   1E09                  MVI    E,9           ;BIT COUNTER
0E4E   78                    MOV    A,B
0E4F   47          DIV0:     MOV    B,A
0E50   79                    MOV    A,C           ;ROTATE CARRY INTO C REGISTER;
0E51   17                    RAL                  ;ROTATE NEXT MOST SIGNIFICANT
                                                  ;BIT TO CARRY
0E52   4F                    MOV    C,A
0E53   1D                    DCR    E
0E54   CA610E                JZ     DIV1
0E57   78                    MOV    A,B           ;ROTATE MOST SIGNIFICANT BIT TO
0E58   17                    RAL                  ;HIGH-ORDER QUOTIENT
0E59   92                    SUB    D             ;SUBSTRACT DIVISOR. IF LESS THAN
0E5A   D24F0E                JNC    DIV0          ;HIGH-ORDER QUOTIENT, GO TO
                                                  ;DIV0
0E5D   82                    ADD    D             ;OTHERWISE ADD IT BACK
0E5E   C34F0E                JMP    DIV0
0E61   17          DIV1:     RAL
0E62   5F                    MOV    E,A
0E63   3EFF                  MVI    A,0FFH        ;COMPLEMENT THE QUOTIENT
0E65   A9                    XRA    C
0E66   4F                    MOV    C,A
0E67   7B                    MOV    A,E
0E68   1F                    RAR

0E69   D1                    POP    D
0E6A   79                    MOV    A,C           ;PROTECT FROM OVERFLOW
0E6B   E6F0                  ANI    0F0H
0E6D   CA720E                JZ     $+5
0E70   0E0F                  MVI    C,00FH
0E72   79                    MOV    A,C           ;LOAD QUOTENT
0E73   C1                    POP    B
0E74   92                    SUB    D             ;TEST
0E75   210418                LXI    H,RAB
0E78   C9                    RET                  ;GO LET PROPER ROUTINE TEST
```

```
                ;
                ;       SET NUMERATOR AND DENOMINATOR
                ;
0E79            SETND:                          ;WT/16
0E79    17              RAL                     ;WI*1
0E7A    D8              RC                      ;CASE 5
0E7B    05              DCR     B               ;WT/8
0E7C    17              RAL                     ;WI*2
0E7D    D8              RC                      ;CASE 4
0E7E    05              DCR     B               ;WT/4
0E7F    17              RAL                     ;WI*4
0E80    D8              RC                      ;CASE 3
0E81    05              DCR     B               ;WT/2
0E82    17              RAL                     ;WI*8
0E83    D8              RC                      ;CASE 2
0E84    05              DCR     B               ;WT/1
0E85    17              RAL                     ;WI*16
0E86    C9              RET                     ;CASE 1

;       ZERO DIVISOR
0E87            WERR:
0E87    D1              POP     D
0E88    C1              POP     B
0E89    C1              POP     B               ;DROP RETURN
                ;       AUTO REJECT
                ;
                ;       REJECT
                ;
0E8A    1600    REJ:    MVI     D,0             ;SET ZERO RETURN
0E8C.           TVVX:
0E8C    E1              POP     H               ;DROP TPRO CALL
        1       +       FETCH   MQEND
0E8D 1  21031C  +       LXI     H,RBASE+MQEND
0E90    3610            MVI     M,MQSTART
0E92    7A              MOV     A,D             ;SET RETURN CHARACTER
0E93    E63F            ANI     03FH
0E95    37              STC                     ;SET DATA AVAIL FLAG
0E96    C9              RET                     ;RETURN TO CALLER

;
                ;       RESET
                ;
0E97            RSET:
0E97    56              MOV     D,M             ;SET MS ABSOLUTE ADDRESS
        1       +       FETCH   MQPTR           ;SET INITIAL MEMORY POINTER
0E98 1  21041C  +       LXI     H,RBASE+MQPTR
0E9B    3610            MVI     M,MQSTART
0E9D    C3890D          JMP     ABSAD

END

NO PROGRAM ERRORS
NO PROGRAM ERRORS
```

SYMBOL TABLE

```
* 01

A       0007    ABSAD   0D89    B       0000    C       0001
CND     0DE1    COND    0008    CTEST   0E16    CTLO    0A75
CTL1    0A9F    CTL2    0AB2    CTL3    0B02    CTL4    0ACA
CUP     0010    D       0002    DETEC   0020    DIR     0001
DIV0    0E4F    DIV1    0E61    E       0003    EOS     0D39
EOSP    0D83    FERR    0B09    FETCH   03E3    FLAGS   0000
FRDY    0002    FREJ    0B09    FSTAT   1801    FTR     0B0D
FTR1    0B7D    FTR2    0B65    FTR3    0B5F    FTR4    0BCF
FTR5    0C17    FTR51   0C1C    FTR6    0C20    FTR7    0C3B
FTR8    0C44    FTR9    0BF4    FWIDT   000A    H       0004
HAR     1800    JTW     0D73    JTWP    0D83    L       0005
L1      0A5B    M       0006    MQEND   0003    MQMAX   0038
MQPTR   0004    MQSTA   0010    MV      0005    OTAB1   0A03
OTAB2   0A23    PBASE   0A00    PSW     0006    R0      0C48
R5      0C70    R6      0C9D    RAB     1804    RBASE   1C00
RECB    0A43    REJ     0E8A    RELAD   0DAB    RELS    0DC4
RL      0DEB    RS      0DC9    RSET    0E97    RSP     0DFB
```

| | | | | | | | |
|---|---|---|---|---|---|---|---|
| SAME | 000B | SETND | 0E79 | SLUF | 0040 * | SNODE | 000D |
| SP | 0006 | SPACE | 0080 | SWIDT | 0007 | TBWID | 000F |
| TL | 0D1E | TLP | 0D32 | TM | 0CF4 | TMP | 0D0F |
| TNODE | 0001 | TPR0 | 0CA3 | TPR01 | 0CAA | TPR02 | 0CC2 |
| TRL | 0D5B | TRLP | 0D83 | TRS | 0D49 | TRSP | 0DA7 |
| TS | 0CD4 | TSP | 0CED | TVVX | 0EBC | TWIDT | 0008 |
| TWL | 0D6B | TWLP | 0D83 | TWS | 0D9C | TWSP | 0DA6 |
| WA | 1805 | WB | 1806 | WERR | 0E87 | WIDTH | 000C |
| WTEST | 0E2D | | | | | | |

* 02

* 03

* 04

* 05

* 06

* 07

* 08

* 09

* 10

I claim:

1. An apparatus for recognizing characters such as alpha-numeric characters comprising:
    scanning means for viewing a character and for providing video signals representative of generally parallel slices of such character;
    feature extraction means, coupled to receive said video signals from said scanning means, for detecting features from said signals as they are received and for assigning predetermined codes to said detected features, said feature extraction means providing a sequence of coded signals representing said detected features for said generally parallel slices of such character;
    logic tree means, coupled to receive said coded signals from said feature extraction means each time a change occurs in said coded signals, for logically evaluating each of said coded signals to determine the possible characters having features corresponding to said coded signals, such tree means narrowing such possible characters as said coded signals are evaluated until such character is identified;
    whereby characters are identified without storage of video data.

2. The apparatus defined by claim 1 wherein said scanning means includes a dynamic thresholding means for providing a dynamic threshold potential which is compared with said video signal to compensate for variation in printing density and background coloring.

3. The apparatus defined by claim 2 wherein said scanning means includes a light-sensitive linear array which is held in general vertical alignment with such character during said viewing with relative motion occurring between said array and such character to provide said generally parallel slices.

4. The apparatus defined by claim 1, including a plurality of said linear arrays aligned parallel to one another coupled to a weighting network for combining signals from said arrays to provide a channel of said video signals.

5. The apparatus defined by claim 4 including two of said channels of said video signals.

6. The apparatus defined by claim 5 including a zone control means for compensating for vertical misalignments between the field-of-view of said scanning means and viewed characters.

7. The apparatus defined by claim 6 wherein said zone control means provides a zone control signal which is used to select a portion of said video signals for said detection.

8. The apparatus defined by claims 6 or 7 wherein said zone control means provides an updated zone control signal after scanning a character to provide said compensation for misalignments for the next character.

9. The apparatus defined by claim 1 wherein said sequence of coded signals provided by said feature extraction means comprises a plurality of digital words, one of said words being provided for each of said slices.

10. The apparatus defined by claim 9 including a first-in, first-out register coupled to receive said digital words and coupled to communicate said digital words to said logic tree means.

11. The apparatus defined by claim 10 including storage means for storing each of said digital words in said register, a digital number representing the number of said slices during which said word was detected.

12. An apparatus for recognizing characters, such as alpha-numeric characters, comprising:
    scanning means for viewing a character and for providing a first channel and a second channel of video signals representing generally parallel slices through such character;

direction detection means for determining the direction of relative movement between said scanning means and such character, said detecting means coupled to receive said first channel and second channel of video signals and for making said direction determination based on said video signals;

first feature extracting means for receiving at least one of said first and second channels of video signals and for detecting first predetermined features;

second feature extracting means for receiving said first and said second channels of video signals and for detecting second predetermined features;

encoding means for encoding digital words with said first and said second predetermined features as said features are detected by said first and said second feature extracting means; and logic tree means coupled to receive said digital words from said encoding means and coupled to said direction detection means, for analyzing said words to determine possible characters possessing said detected features;

whereby characters may be recognized with storage of video data.

13. The apparatus defined by claim 12 wherein said first predetermined features include the detection of bars and gaps.

14. The apparatus defined by claim 13 wherein said second predetermined features include an indication of the direction of character development.

15. A method for recognizing characters comprising the steps of:

generating a plurality of video signals, each representing sequential parallel slices of a character;

examining each of said video signals to identify predetermined features of characters;

encoding digital words with identified ones of said predetermined features for each of said slices;

examining said digital words to determine a change between one word and the next to provide a sequence of changed ones of said digital words;

analyzing said sequence of changed words, one after the other, to determine the possible characters possessing said identified features, said analysis of said changed digital words continuing until a character is recognized;

whereby a character is recognized with a minimum amount of memory.

16. The method defined by claim 15 including counting the number of slices between said changed words to provide width indication of said identified features.

17. The method defined by claim 15 wherein one of said predetermined features is a bar in a character.

18. The method defined by claim 17 wherein another of said predetermined features is a stroke which is shorter than said bar.

19. The method defined by claim 18 wherein another of said predetermined features is a gap.

20. In an apparatus for recognizing characters, such as alpha-numeric characters, a means for determining the direction of character development comprising:

scanning means for viewing a character and for providing first and second video signals representing two parallel, spaced-apart slices through such character;

first feature extracting means for receiving said first and second video signals and for detecting first predetermined features from said first and second video signals;

second feature extracting means for receiving signals representing said detected first predetermined features for said first and second video signals and for detecting second predetermined features based on a common time comparison of said first predetermined features;

whereby said second predetermined features provide an indication of the direction of character development.

* * * * *